(12) United States Patent
Wang et al.

(10) Patent No.: US 9,787,982 B2
(45) Date of Patent: Oct. 10, 2017

(54) NON-SQUARE TRANSFORM UNITS AND PREDICTION UNITS IN VIDEO CODING

(75) Inventors: Xianglin Wang, San Diego, CA (US); Marta Karczewicz, San Diego, CA (US); Liwei Guo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 235 days.

(21) Appl. No.: 13/608,380

(22) Filed: Sep. 10, 2012

(65) Prior Publication Data

US 2013/0136175 A1 May 30, 2013

Related U.S. Application Data

(60) Provisional application No. 61/533,703, filed on Sep. 12, 2011, provisional application No. 61/536,414,
(Continued)

(51) Int. Cl.
| | |
|---|---|
| *H04N 11/02* | (2006.01) |
| *H04N 11/04* | (2006.01) |
| *H04N 19/61* | (2014.01) |
| *H04N 19/176* | (2014.01) |
| *H04N 19/122* | (2014.01) |
| *H04N 19/593* | (2014.01) |

(Continued)

(52) U.S. Cl.
CPC ....... *H04N 19/00781* (2013.01); *H04N 19/11* (2014.11); *H04N 19/122* (2014.11); *H04N 19/157* (2014.11); *H04N 19/176* (2014.11); *H04N 19/593* (2014.11); *H04N 19/61* (2014.11)

(58) Field of Classification Search
None
See application file for complete search history.

(56) References Cited

U.S. PATENT DOCUMENTS

| | | | |
|---|---|---|---|
| 8,344,917 B2 * | 1/2013 | Misra et al. | 341/107 |
| 2008/0310745 A1 * | 12/2008 | Ye | H04N 19/61 |
| | | | 382/238 |

(Continued)

FOREIGN PATENT DOCUMENTS

| | | |
|---|---|---|
| CN | 1476253 A | 2/2004 |
| CN | 102577393 A | 7/2012 |

(Continued)

OTHER PUBLICATIONS

Wiegand et al., "WD1: Working Draft 1 of High-Efficiency Video Coding", JCTVC-C403, 3rd Meeting: Guangzhou, CN, Oct. 7-15, 2010, 137 pp.

(Continued)

*Primary Examiner* — Jeremaiah C Hallenbeck-Huber
*Assistant Examiner* — Samuel D Fereja

(57) ABSTRACT

This disclosure proposes techniques for transform partitioning in an intra-prediction video coding process. In one example, for a given intra-predicted block, a reduced number of transform unit partition options is allowed, based on certain conditions. In another example, transform units are decoupled from prediction units for intra-predicted block. For a given prediction unit, transforms of different sizes and shapes from the prediction unit may be applied. In another example, a reduced number of intra-prediction modes are allowed for a prediction unit having a non-square shape.

52 Claims, 10 Drawing Sheets

Related U.S. Application Data filed on Sep. 19, 2011, provisional application No. 61/552,216, filed on Oct. 27, 2011.

(51) Int. Cl.
*H04N 19/11* (2014.01)
*H04N 19/157* (2014.01)

(56) References Cited

U.S. PATENT DOCUMENTS

| | | | |
|---|---|---|---|
| 2010/0086032 A1* | 4/2010 | Chen | H04N 19/176 375/240.12 |
| 2010/0086049 A1* | 4/2010 | Ye et al. | 375/240.16 |
| 2010/0098156 A1* | 4/2010 | Karczewicz | H04N 19/105 375/240.12 |
| 2010/0158103 A1* | 6/2010 | Ye | H04N 19/176 375/240.02 |
| 2011/0038412 A1* | 2/2011 | Jung et al. | 375/240.12 |
| 2011/0135000 A1* | 6/2011 | Alshina et al. | 375/240.13 |
| 2011/0176607 A1 | 7/2011 | Kim et al. | |
| 2011/0243225 A1 | 10/2011 | Min et al. | |
| 2011/0249743 A1 | 10/2011 | Zhao et al. | |
| 2011/0255591 A1 | 10/2011 | Kim et al. | |
| 2012/0213278 A1 | 8/2012 | Yasugi et al. | |
| 2012/0230394 A1* | 9/2012 | Lu et al. | 375/240.02 |
| 2012/0281928 A1* | 11/2012 | Cohen et al. | 382/240 |
| 2014/0233633 A1* | 8/2014 | Hannuksela | H04N 21/23614 375/240.02 |

FOREIGN PATENT DOCUMENTS

| | | |
|---|---|---|
| EP | 2493198 A1 | 8/2012 |
| JP | 2009005413 A | 1/2009 |
| WO | 2010039822 A2 | 4/2010 |
| WO | 2010116869 A1 | 10/2010 |
| WO | 2011049119 A1 | 4/2011 |
| WO | 2011083599 A1 | 7/2011 |
| WO | 2011133002 A2 | 10/2011 |

OTHER PUBLICATIONS

Bross et al., "High efficiency video coding (HEVC) text specification draft 6," 7th Meeting: Geneva, CH, Nov. 21-30, 2011, JCTVC-H1003, 259 pp.

Bross et al., "High efficiency video coding (HEVC) text specification draft 7," 9th Meeting: Geneva, CH, Apr. 27-May 7, 2012, JCTVC-I1003_d21, 290 pp.

Bross et al., "High efficiency video coding (HEVC) text specification draft 8," 10th Meeting: Stockholm, SE, Jul. 11-20, 2012, JCTVC-J1003_d7, 261 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, Switzerland, Nov. 2011, JCTVC-G1103_d2, 214 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Wiegand et al., "WD3: Working Draft 3 of High-Efficiency Video Coding," Document JCTVC-E603, 5th Meeting: Geneva, CH, Mar. 16-23, 2011,193 pp.

Wiegand et al., "WD2: Working Draft 2 of High-Efficiency Video Coding," JCTVC-D503, Jan. 20-28, 2011, 153 pp.

Bross, et al., "High efficiency video coding (HEVC) text specification draft 6," JCTVC-H1003, Joint Collaborative Team on Video Coding (JCT-VC) of ITU-T SG16 WP3 and ISO/IEC JTC1/SC29/WG11, 8th Meeting: San José, CA, USA, Feb. 1-10, 2012, 259 pp.

Cao, et al., "CE6.b1 Report on Short Distance Intra Prediction Method," JCTVC-E278, Joint Collaborative Team on Video Coding (JCTVC-E278) of ITU-T SG16 WP3 and ISO/IEC JTC1/SC29/WG11, 5th Meeting: Geneva, Mar. 16-23, 2011, 7 pp.

Chang, et al.,"Direction-Adaptive Partitioned Block Transform for Color Image Coding", IEEE Transactions on Image Processing, IEEE Service Center, Piscataway, NJ, US, vol. 18, No. 7, Jul. 1, 2010 (Jul. 1, 2010), pp. 1740-1755, XP011304431, ISSN: 1057-7149.

International Search Report and Written Opinion—PCT/US2012/054654—ISA/EPO—Mar. 8, 2013, 19 pp.

Kim et al., "Fast block mode decision algorithm in H.264/AVC video coding", Journal of Visual Communication and Image Representation, Academic Press, Inc, US, vol. 19, No. 3, Mar. 1, 2008 (Mar. 1, 2008), pp. 175-183, XP022507424, ISSN: 1047-3203, DOI: 10.1016/J.JVCIR.2007.09.001.

Wien "Variable Block-Size Transforms for Hybrid Video Coding", Dissertation Der Rheinisch-Westfaelischen Technischen Hochschule Aachen, Feb. 3, 2004 (Feb. 3, 2004), pp. 1-183, XP002481661 [uploaded in parts].

Pan et al., "Fast Mode Decision for Intra Prediction", Joint Video Team (JUT) of ISO/IEC MPEG & ITU-T VCEG (ISO/IEC JTC1/SC29/WG11 and ITU-T SG16 Q6), XX, XX, Mar. 7, 2003 (Mar. 7, 2003), XP002325066, 22 pp.

Partial International Search Report—PCT/US2012/054654—ISA/EPO—Dec. 4, 2012, 8 pp.

Response to Written Opinion dated Mar. 8, 2013, from International Application No. PCT/US2012/054654, filed Sep. 10, 2013, 31 pp.

International Preliminary Report on Patentability from U.S. Patent Application No. PCT/US2012/054654, dted Mar. 10, 2014, 27 pp.

Invitation to Restrict or Pay Additional Fees from International Application No. PCT/US2012/054654, dated Oct. 28, 2013, 4 pp.

E-mail correspondence from European Office Action regarding International Application No. PCT/US2012/054654, dated Feb. 12, 2014, 3 pp.

Response to European e-mail dated Feb. 12, 2014 from International Application No. PCT/US2012/05654, filed Feb. 14, 2014, 14 pp.

Saxena et al., "CE7: Mode-dependent DCT/DST without 4*4 full matrix multiplication for intra prediction," MPEG Meeting; Mar. 16-23, 2011; Geneva, CH (Motion Picture Expert Group or ISO/IEC JTC1/SC29/WG11), No. m19640, JCTVC-E125, Mar. 20, 2011, XP030048207, 10 pp.

* cited by examiner

2Nx2N mode    NxN mode

NON-SQUARE TRANSFORM UNITS AND PREDICTION UNITS IN VIDEO CODING

This application claims the benefit of U.S. Provisional Application No. 61/533,703, filed Sep. 12, 2011, U.S. Provisional Application No. 61/536,414, filed Sep. 19, 2011, and U.S. Provisional Application No. 61/552,216, filed Oct. 27, 2011, the entire content of each of which is incorporated herein by reference.

TECHNICAL FIELD

This disclosure relates to video coding, and more particularly to techniques selecting and signaling transform unit and prediction unit partitions for intra-predicted block when coding video data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards, to transmit, receive and store digital video information more efficiently.

Video compression techniques include spatial prediction and/or temporal prediction to reduce or remove redundancy inherent in video sequences. For block-based video coding, a video frame or slice may be partitioned into blocks. Each block can be further partitioned. Blocks in an intra-coded (I) frame or slice are encoded using spatial prediction with respect to reference samples in neighboring blocks in the same frame or slice. Blocks in an inter-coded (P or B) frame or slice may use spatial prediction with respect to reference samples in neighboring blocks in the same frame or slice or temporal prediction with respect to reference samples in other reference frames. Spatial or temporal prediction results in a predictive block for a block to be coded. Residual data represents pixel differences between the original block to be coded and the predictive block.

An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in a particular order to produce a one-dimensional vector of transform coefficients for entropy coding.

SUMMARY

In general, this disclosure describes techniques for coding video data. This disclosure describes techniques for selecting and signaling transform partitions in video encoding processes that allow for non-square transform partitions. In some examples, the transform partitions are selected based on an intra-prediction coding mode. In other examples, the transform partitions do not depend on the size or shape of the prediction unit, but may be independently selected from testing on prediction residuals. In addition, this disclosure describes techniques for decreasing encoded video bit rate and for reducing encoder complexity by reducing the number of intra-mode sets available for short distance intra-prediction (SDIP) partitions.

In one example of the disclosure, a video encoder may be configured to determine a prediction unit partition from among a plurality of prediction unit partitions for the block of video data, and determine a set of intra-prediction modes based on the determined prediction unit partition. In one example, the determined prediction unit partition is a vertically-oriented non-square prediction unit partition, and the set of intra-prediction modes includes vertically-oriented intra-prediction modes. In another example, the determined prediction unit partition is a horizontally-oriented non-square prediction unit partition, and the set of intra-prediction modes includes horizontally-oriented intra-prediction modes.

In another example of the disclosure, a video encoder may be further configured to determine an intra-prediction mode from a set of intra-prediction modes for a block of video data, determine a transform unit partition for the block of video data based on the determined intra-prediction mode, and encode the block of video data using the determined transform unit partition.

In another example of the disclosure, a video encoder may be configured to determine the transform unit partition from a set of transform unit partitions based on the intra-prediction mode. In one example, the determined intra-prediction mode is a vertically-oriented intra-prediction mode, and the set of transform unit partitions includes vertically-oriented non-square transform unit partitions. In another example, the determined intra-prediction mode is a horizontally-oriented intra-prediction mode, and the set of transform unit partitions includes horizontally-oriented non-square transform unit partitions. In still another example, the determined intra-prediction mode is a DC mode, a planar mode, or a diagonal mode, and the set of transform unit partitions includes square transform unit partitions.

In another example of the disclosure, a video decoder may be configured to receive an indication of a prediction unit partition from among a plurality of prediction unit partitions for the block of video data, and determine a set of intra-prediction modes based on the prediction unit partition. In one example, the prediction unit partition is a vertically-oriented non-square prediction unit partition, and the set of intra-prediction modes includes vertically-oriented intra-prediction modes. In another example, the prediction unit partition is a horizontally-oriented non-square prediction unit partition, and the set of intra-prediction modes includes horizontally-oriented intra-prediction modes.

In another example of the disclosure, a video decoder may be further configured to receive an indication of an intra-prediction mode from a set of intra-prediction modes for a block of video data, determine a transform unit partition for the block of video data based on the determined intra-prediction mode, and decode the block of video data using the determined transform unit partition.

In another example of the disclosure, a video decoder may be configured to determine the transform unit partition from a set of transform unit partitions based on the intra-prediction mode. In one example, the determined intra-prediction mode is a vertically-oriented intra-prediction mode, and the set of transform unit partitions includes vertically-oriented non-square transform unit partitions. In another example, the determined intra-prediction mode is a horizontally-oriented intra-prediction mode, and the set of transform unit partitions includes horizontally-oriented non-square transform unit partitions. In still another example, the determined intra-prediction mode is a DC mode, a planar mode, or a diagonal mode, and the set of transform unit partitions includes square transform unit partitions.

Examples of this disclosure will also be described in terms of methods, apparatuses, devices, and computer-readable storage mediums.

The details of one or more examples are set forth in the accompanying drawings and the description below. Other features, objects, and advantages will be apparent from the description and drawings, and from the claims.

DETAILED DESCRIPTION

In general, this disclosure describes techniques for coding video data. This disclosure describes techniques for selecting and signaling transform unit (TU) partitions and/or prediction unit (PU) partitions in video coding processes. In particular, example techniques of this disclosure allow for the use of non-square TU partitions and/or non-square PU transforms.

For an intra-predicted block, since the TU is coupled together with the PU (i.e., they have the same size and/or shape), checking different options of TU partitions within a block may involve performing multiple predictions and reconstructions, as each unique TU partition is matched with a unique PU partition. As a result, encoding complexity becomes significantly higher with additional non-square partitions being checked and signaled. This high encoder complexity may make it impractical to use non-square transforms in addition to square transforms for coding an intra-predicted block in some situations. In view of these drawbacks, the current disclosure aims at enabling non-square TU partitions for intra-predicted blocks with reduced complexity, while preserving coding efficiency.

This disclosure presents several techniques for addressing these drawbacks. As one example, for a given intra-predicted block, a reduced number of TU partition options is allowed, based on certain conditions. In another example, this disclosure proposes decoupling TUs from PUs for intra-predicted blocks. For a given PU, TUs of different sizes and shapes from the corresponding PU may be applied. In this case, at least some TUs used to transform residual data for particular PUs may have different sizes and/or shapes than such PUs. As a result, checking different TU partitions would not require obtaining the corresponding prediction of the block separately because different TU shapes may be applied to the prediction obtained from one PU size and shape.

Figure 2:
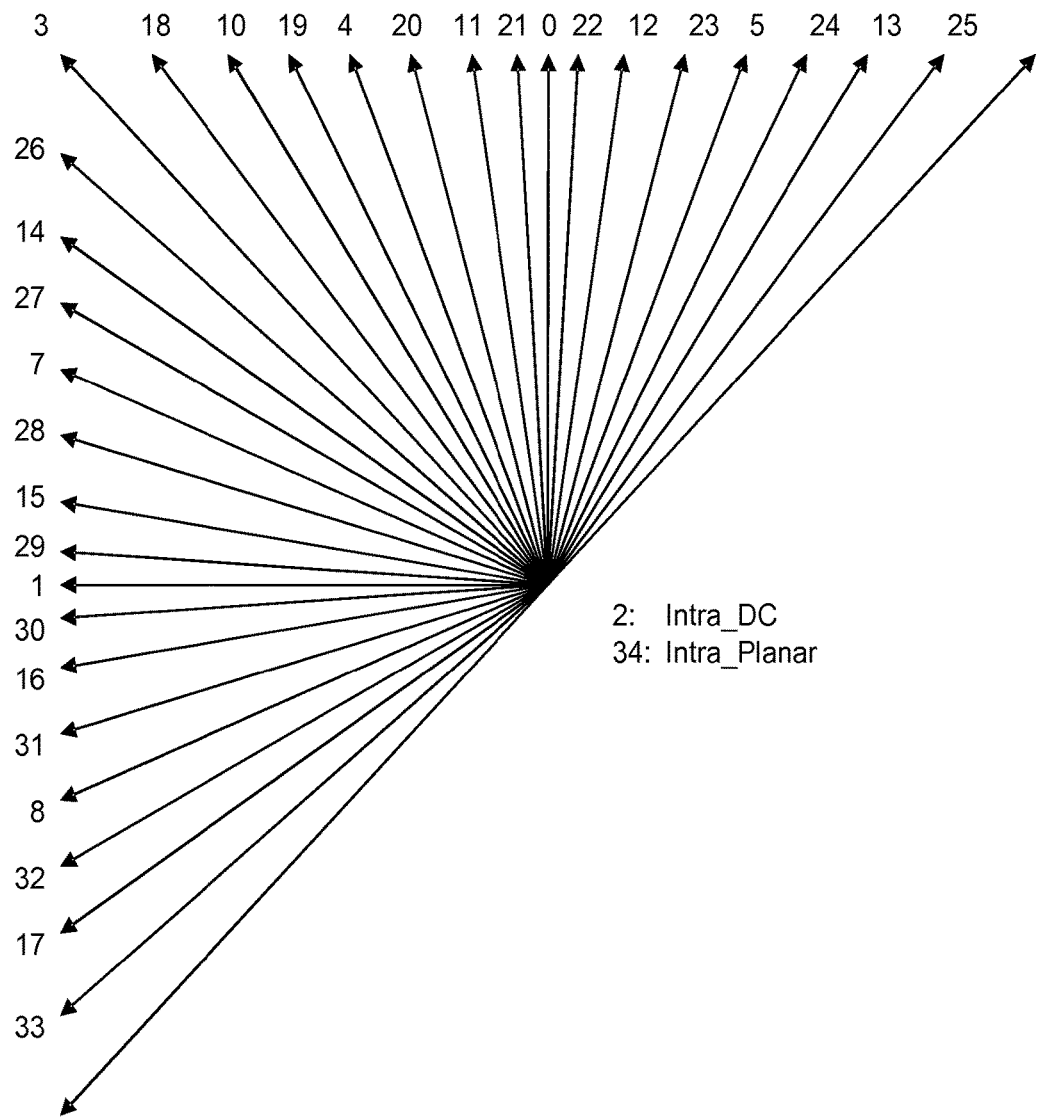
FIG. 2 is a conceptual diagram illustrating example intra-prediction mode directions.

When using non-square PUs, for example, with short distance intra-prediction (SDIP), each PU may use one of a plurality of intra-prediction modes/directions (e.g., the 35 modes of FIG. 2). There are several drawbacks to this arrangement. First, to signal the selected mode to a decoder for each PU, an index for the selected mode is signaled in the encoded video bitstream. Since the uncertainty of which intra-prediction will be used is high (i.e., there may be 35 modes), a relatively large number of bits is used to encode the index, which increases the bit rate for the compressed video. Second, an encoder may have to check every mode to determine the best one to use, or at least to identify a mode that satisfies a requirement, such as, e.g., a rate-distortion threshold. With all intra-prediction modes/directions possible for each PU, this checking process increases the computational burden at the encoder.

This disclosure proposes techniques for decreasing encoded video bit rate and for reducing encoder complexity by reducing the number of possible intra-prediction modes for square and non-square SDIP partitions. Such a reduction in the number of possible intra-prediction modes is based on observations that, for vertically partitioned CUs (e.g., an hN×2N PU), vertical or nearly vertical intra-prediction modes (e.g., modes 1, 22, 23 . . . ) are more likely to be selected as the best mode. Similarly, for horizontally partitioned CUs (e.g., a 2N×hN PU), horizontal or nearly horizontal intra-prediction modes (e.g., modes 2, 30, 31 . . . ) are more likely to be selected as the best mode. That is, such modes are more likely to be selected because they are more likely to produce more favorable rate-distortion results for given partition types.

Figure 1:
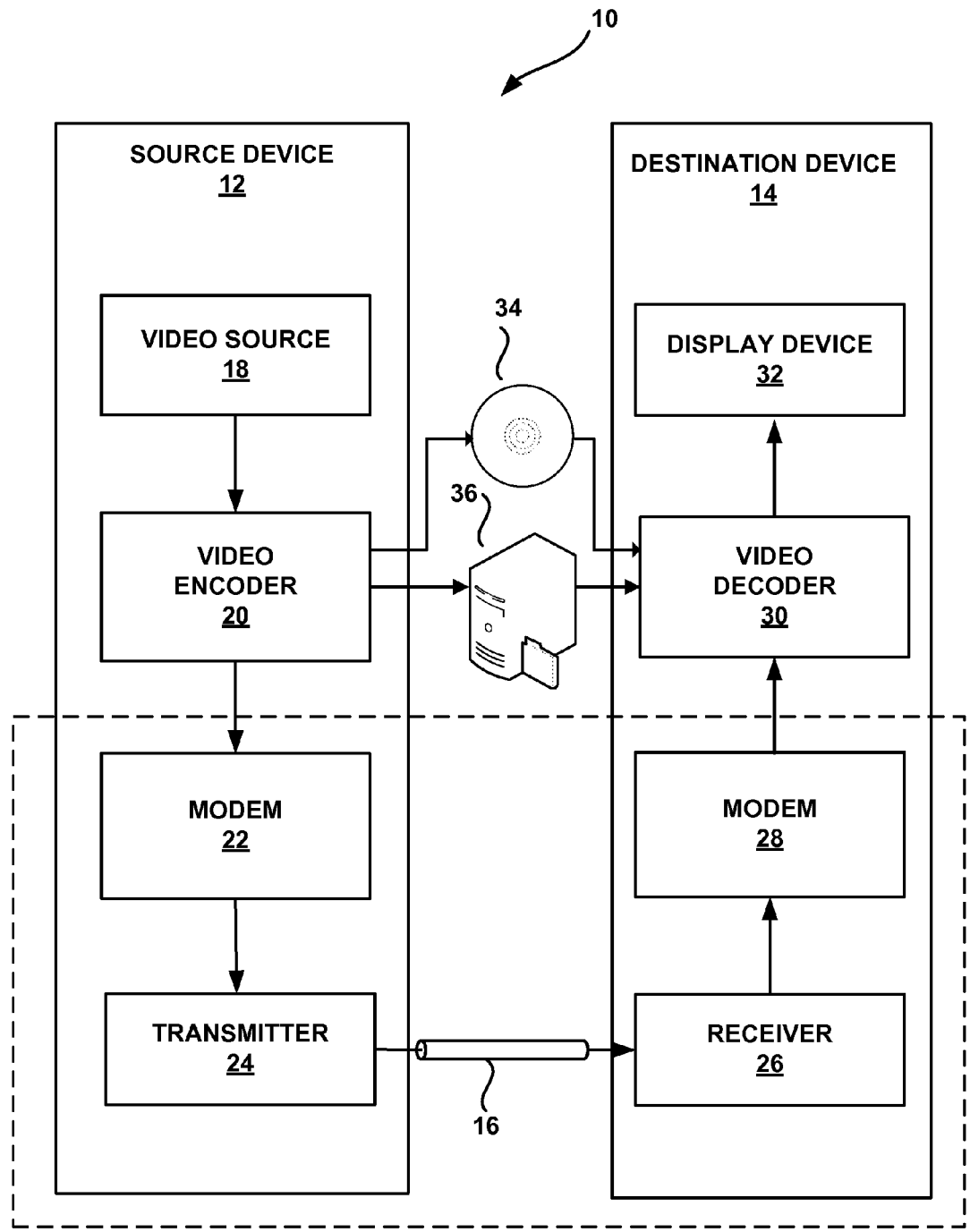
FIG. 1 is a block diagram illustrating an example video encoding and decoding system that operates according to examples of this disclosure.

FIG. 1 is a block diagram illustrating an example video encoding and decoding system 10 that may be configured to utilize techniques for intra-prediction coding in accordance with examples of this disclosure. As shown in FIG. 1, system 10 includes source device 12 that transmits encoded video to destination device 14 via communication channel 16. Encoded video data may also be stored on storage medium 34 or file server 36 and may be accessed by destination device 14 as desired. When stored to a storage medium or file server, video encoder 20 may provide coded video data to another device, such as a network interface, a compact disc (CD), Blu-ray or digital video disc (DVD) burner or stamping facility device, or other devices, for storing the coded video data to the storage medium. Likewise, a device separate from video decoder 30, such as a network interface, CD or DVD reader, or the like, may retrieve coded video data from a storage medium and provided the retrieved data to video decoder 30.

Source device 12 and destination device 14 may comprise any of a wide variety of devices, including desktop computers, notebook (i.e., laptop) computers, tablet computers, set-top boxes, telephone handsets such as so-called smartphones, televisions, cameras, display devices, digital media players, video gaming consoles, or the like. In many cases, such devices may be equipped for wireless communication. Hence, communication channel 16 may comprise a wireless channel, a wired channel, or a combination of wireless and wired channels suitable for transmission of encoded video data. Similarly, file server 36 may be accessed by destination device 14 through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server.

Techniques for intra-prediction coding, in accordance with examples of this disclosure, may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, modulator/demodulator 22 and transmitter 24. In source device 12, video source 18 may include a source such as a video capture device, such as a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications, or application in which encoded video data is stored on a local disk.

The captured, pre-captured, or computer-generated video may be encoded by video encoder 20. The encoded video information may be modulated by modem 22 according to a communication standard, such as a wireless communication protocol, and transmitted to destination device 14 via transmitter 24. Modem 22 may include various mixers, filters, amplifiers or other components designed for signal modulation. Transmitter 24 may include circuits designed for transmitting data, including amplifiers, filters, and one or more antennas.

The captured, pre-captured, or computer-generated video that is encoded by video encoder 20 may also be stored onto storage medium 34 or file server 36 for later consumption. Storage medium 34 may include Blu-ray discs, DVDs, CD-ROMs, flash memory, or any other suitable digital storage media for storing encoded video. The encoded video stored on storage medium 34 may then be accessed by destination device 14 for decoding and playback.

File server 36 may be any type of server capable of storing encoded video and transmitting that encoded video to destination device 14. Example file servers include a web server (e.g., for a website), an FTP server, network attached storage (NAS) devices, a local disk drive, or any other type of device capable of storing encoded video data and transmitting it to a destination device. The transmission of encoded video data from file server 36 may be a streaming transmission, a download transmission, or a combination of both. File server 36 may be accessed by destination device 14 through any standard data connection, including an Internet connection. This may include a wireless channel (e.g., a Wi-Fi connection), a wired connection (e.g., DSL, cable modem, Ethernet, USB, etc.), or a combination of both that is suitable for accessing encoded video data stored on a file server.

Destination device 14, in the example of FIG. 1, includes receiver 26, modem 28, video decoder 30, and display device 32. Receiver 26 of destination device 14 receives information over channel 16, and modem 28 demodulates the information to produce a demodulated bitstream for video decoder 30. The information communicated over channel 16 may include a variety of syntax information generated by video encoder 20 for use by video decoder 30 in decoding video data. Such syntax may also be included with the encoded video data stored on storage medium 34 or file server 36. Each of video encoder 20 and video decoder 30 may form part of a respective encoder-decoder (CODEC) that is capable of encoding or decoding video data.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

In the example of FIG. 1, communication channel 16 may comprise any wireless or wired communication medium, such as a radio frequency (RF) spectrum or one or more physical transmission lines, or any combination of wireless and wired media. Communication channel 16 may form part of a packet-based network, such as a local area network, a wide-area network, or a global network such as the Internet. Communication channel 16 generally represents any suitable communication medium, or collection of different communication media, for transmitting video data from source device 12 to destination device 14, including any suitable combination of wired or wireless media. Communication channel 16 may include routers, switches, base stations, or any other equipment that may be useful to facilitate communication from source device 12 to destination device 14.

Video encoder 20 and video decoder 30 may operate according to a video compression standard, such as the High Efficiency Video Coding (HEVC) standard presently under development, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples include MPEG-2 and ITU-T H.263.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

Video encoder 20 may implement any or all of the techniques of this disclosure for intra-prediction coding in a video encoding process. Likewise, video decoder 30 may implement any or all of these techniques for intra-prediction coding in a video coding process. A video coder, as described in this disclosure, may refer to a video encoder or a video decoder. Similarly, a video coding unit may refer to a video encoder or a video decoder. Likewise, video coding may refer to video encoding or video decoding.

In accordance with examples of this disclosure, discussed in further detail below, video encoder 20 may be configured to determine a prediction unit partition from among a plurality of prediction unit partitions for the block of video data, and determine a set of intra-prediction modes based on the determined prediction unit partition. In one example, the determined prediction unit partition is a vertically-oriented non-square prediction unit partition, and the set of intra-prediction modes includes vertically-oriented intra-prediction modes. In another example, the determined prediction unit partition is a horizontally-oriented, non-square prediction unit partition, and the set of intra-prediction modes includes horizontally-oriented intra-prediction modes.

In another example of the disclosure, video encoder 20 may be further configured to determine an intra-prediction mode from a set of intra-prediction modes for a block of video data, determine a transform unit partition for the block of video data based on the determined intra-prediction mode, and encode the block of video data using the determined transform unit partition.

In another example of the disclosure, video encoder 20 may be configured to determine the transform unit partition from a set of transform unit partitions based on the intra-prediction mode. In one example, the determined intra-prediction mode is a vertically-oriented intra-prediction mode, and the set of transform unit partitions includes vertically-oriented non-square transform unit partitions. In another example, the determined intra-prediction mode is a horizontally-oriented intra-prediction mode, and the set of transform unit partitions includes horizontally-oriented non-square transform unit partitions. In still another example, the determined intra-prediction mode is a DC mode, a planar mode, or a diagonal mode, and the set of transform unit partitions includes square transform unit partitions.

In another example of the disclosure, video decoder 30 may be configured to receive an indication of a prediction unit partition from among a plurality of prediction unit partitions for the block of video data, and determine a set of intra-prediction modes based on the prediction unit partition.

In one example, the prediction unit partition is a vertically-oriented, non-square prediction unit partition, and the set of intra-prediction modes includes vertically-oriented intra-prediction modes. In another example, the prediction unit partition is a horizontally-oriented, non-square prediction unit partition, and the set of intra-prediction modes includes horizontally-oriented intra-prediction modes.

In another example of the disclosure, video decoder 30 may be further configured to receive an indication of an intra-prediction mode from a set of intra-prediction modes for a block of video data, determine a transform unit partition for the block of video data based on the determined intra-prediction mode, and decode the block of video data using the determined transform unit partition.

In another example of the disclosure, video decoder 30 may be configured to determine the transform unit partition from a set of transform unit partitions based on the intra-prediction mode. In one example, the determined intra-prediction mode is a vertically-oriented intra-prediction mode, and the set of transform unit partitions includes vertically-oriented non-square transform unit partitions. In another example, the determined intra-prediction mode is a horizontally-oriented intra-prediction mode, and the set of transform unit partitions includes horizontally-oriented non-square transform unit partitions. In still another example, the determined intra-prediction mode is a DC mode, a planar mode, or a diagonal mode, and the set of transform unit partitions includes square transform unit partitions.

Digital video devices implement video compression techniques to encode and decode digital video information more efficiently. Video compression may apply spatial (intra-frame) prediction and/or temporal (inter-frame) prediction techniques to reduce or remove redundancy inherent in video sequences.

A typical video encoder partitions each frame of the original video sequence into contiguous rectangular regions called "blocks" or "coding units". These blocks are encoded in "intra mode" (I-mode), or in "inter mode" (P-mode or B-mode).

For P-mode, the encoder first searches for a block similar to the one being encoded in a "reference frame," denoted by $F_{ref}$. Searches are generally restricted to being no more than a certain spatial displacement from the block to be encoded. When the best match, or "prediction," has been identified, it is expressed in the form of a two-dimensional (2D) motion vector $(\Delta x, \Delta y)$ where $\Delta x$ is the horizontal and $\Delta y$ is the vertical displacement. The motion vectors together with the reference frame are used to construct predictive block $F_{pred}$ as follows:

$$F_{pred}(x,y)=F_{ref}(x+\Delta x, y+\Delta y)$$

The location of a pixel within the frame is denoted by (x, y). For blocks encoded in I-mode, the predictive block is formed using spatial prediction from previously encoded neighboring blocks within the same frame. For both I-mode and P- or B-mode, the prediction error, i.e., the difference between the pixel values in the block being encoded and pixel values in the predictive block, is represented as a set of weighted basis functions of some discrete transform, such as a discrete cosine transform (DCT). Transforms may be performed based on different size of blocks, such as 4×4, 8×8 or 16×16 and larger. The shape of the transform block is not always square. Rectangular shaped transform blocks can also be used, e.g. with a transform block size of 16×4, 32×8, etc.

The weights (i.e., the transform coefficients) are subsequently quantized. Quantization introduces a loss of information, and as such, quantized coefficients have lower precision than the original transform coefficients. Luma and chroma components of a pixel may be predicted, quantized, and transformed separately. That is, the coding process may be applied to block of luma components of a pixels, as well as to blocks of one or more chroma components of a pixels.

Quantized transform coefficients and motion vectors are examples of "syntax elements." These syntax elements, plus some control information, form a coded representation of the video sequence. Syntax elements may also be entropy coded, thereby further reducing the number of bits needed for their representation. Entropy coding is a lossless operation aimed at minimizing the number of bits required to represent transmitted or stored symbols (in our case syntax elements) by utilizing properties of their distribution (some symbols occur more frequently than others).

In the decoder, the block in the current frame is obtained by first constructing its prediction in the same manner as in the encoder, and by adding to the prediction the compressed prediction error. The compressed prediction error is found by weighting the transform basis functions using the quantized coefficients to produce the pixel difference values. The difference between the reconstructed frame and the original frame is called reconstruction error.

The compression ratio, i.e. the ratio of the number of bits used to represent original sequence and the compressed one, may be controlled by adjusting the value of the quantization parameter (QP) used when quantizing transform coefficients. The compression ratio may depend on the method of entropy coding employed.

There is a new video coding standard, namely High-Efficiency Video Coding (HEVC), being developed by the Joint Collaboration Team on Video Coding (JCT-VC) of ITU-T Video Coding Experts Group (VCEG) and ISO/IEC Motion Picture Experts Group (MPEG). A recent draft of the HEVC standard, referred to as "HEVC Working Draft 7" or "WD7," is described in document JCTVC-I1003, Bross et al., "High efficiency video coding (HEVC) text specification draft 7," Joint Collaborative Team on Video Coding (JCT-VC) of ITU-T SG16 WP3 and ISO/IEC JTC1/SC29/WG11, 9th Meeting: Geneva, CH, 27 April 7 May 2012, which, as of Aug. 21, 2012, is downloadable from http://phenix.int-evry.fr/jct/doc_end_user/documents/9_Geneva/wg11/JCTVC-I1003-v6.zip.

For video coding according to the HEVC standard currently under development by the JCT-VC, as one example, a video frame may be partitioned into coding units. A coding unit (CU) generally refers to an image region that serves as a basic unit to which various coding tools are applied for video compression. A CU usually has a luminance component, denoted as Y, and two chroma components, denoted as U and V. Depending on the video sampling format, the size of the U and V components, in terms of number of samples, may be the same as or different from the size of the Y component. A CU is typically square, and may be considered to be similar to a so-called macroblock, e.g., under other video coding standards such as ITU-T H.264.

To achieve better coding efficiency, a coding unit may have variable sizes depending on video content. In addition, a CU may be split into smaller blocks for prediction or transform. In particular, each CU may be further partitioned into prediction units (PUs) and transform units (TUs). PUs may be considered to be similar to so-called partitions under other video coding standards, such as H.264. Transform units (TUs) refer to blocks of residual data to which a transform is applied to produce transform coefficients.

Coding according to some of the presently proposed aspects of the developing HEVC standard will be described in this application for purposes of illustration. However, the techniques described in this disclosure may be useful for other video coding processes, such as those defined according to ITU-T H.264 or other standard or proprietary video coding processes.

HEVC standardization efforts are based on a model of a video coding device referred to as the HEVC Test Model (HM). The HM presumes several capabilities of video coding devices over devices according to, e.g., ITU-T H.264/AVC. For example, whereas H.264 provides nine intra-prediction encoding modes, HM provides as many as thirty-five intra-prediction encoding modes.

The thirty-five intra-prediction modes in HEVC include one DC mode, one planar mode, and 33 different directional prediction modes. With a directional prediction mode, prediction is performed based on neighboring block reconstructed pixels along a certain direction indicated by the mode. The directions (0-34) associated with different prediction modes are shown in FIG. 2.

According to the HM, a CU may include one or more PUs and/or one or more TUs. Syntax data within a bitstream may define a largest coding unit (LCU), which is a largest CU in terms of the number of pixels. In general, a CU has a similar purpose to a macroblock of H.264, except that a CU does not have a size distinction. Thus, a CU may be split into sub-CUs. In general, references in this disclosure to a CU may refer to a largest coding unit of a picture or a sub-CU of an LCU. An LCU may be split into sub-CUs, and each sub-CU may be further split into sub-CUs. Syntax data for a bitstream may define a maximum number of times an LCU may be split, referred to as CU depth. Accordingly, a bitstream may also define a smallest coding unit (SCU). This disclosure also uses the term "block", "partition," or "portion" to refer to any of a CU, PU, or TU. In general, "portion" may refer to any sub-set of a video frame.

An LCU may be associated with a quadtree data structure. In general, a quadtree data structure includes one node per CU, where a root node corresponds to the LCU. If a CU is split into four sub-CUs, the node corresponding to the CU includes four leaf nodes, each of which corresponds to one of the sub-CUs. Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU.

Moreover, TUs of leaf-CUs may also be associated with respective quadtree data structures. That is, a leaf-CU may include a quadtree indicating how the leaf-CU is partitioned into TUs. This disclosure refers to the quadtree indicating how an LCU is partitioned as a CU quadtree and the quadtree indicating how a leaf-CU is partitioned into TUs as a TU quadtree. The root node of a TU quadtree generally corresponds to a leaf-CU, while the root node of a CU quadtree generally corresponds to an LCU. TUs of the TU quadtree that are not split are referred to as leaf-TUs.

A leaf-CU may include one or more prediction units (PUs). In general, a PU represents all or a portion of the corresponding CU, and may include data for retrieving a reference sample for the PU. For example, when the PU is inter-mode encoded, the PU may include data defining a motion vector for the PU. The data defining the motion vector may describe, for example, a horizontal component of the motion vector, a vertical component of the motion vector, a resolution for the motion vector (e.g., integer pixel precision, one-quarter pixel precision or one-eighth pixel precision), a reference frame to which the motion vector points, and/or a reference list (e.g., list 0 or list 1) for the motion vector. Data for the leaf-CU defining the PU(s) may also describe, for example, partitioning of the CU into one or more PUs. Partitioning modes may differ depending on whether the CU is not predictively coded, intra-prediction mode encoded, or inter-prediction mode encoded. For intra coding, a PU may be treated the same as a leaf transform unit described below.

Figure 3:
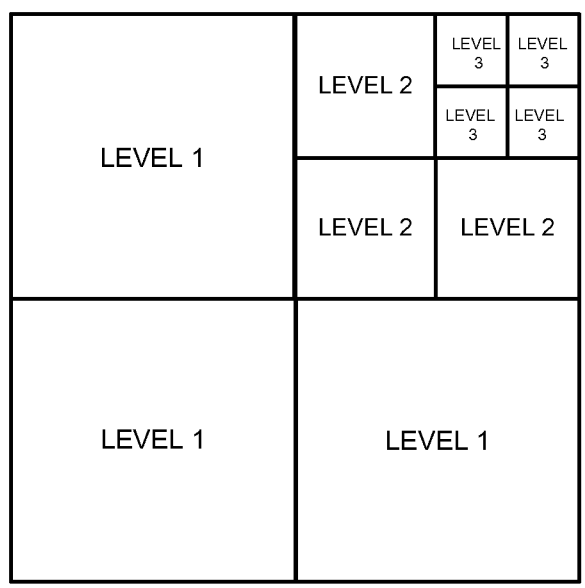
FIG. 3 is a conceptual diagram of an example quad-tree block structure.

HEVC also allows a quadtree style transform unit partition structure. As shown in FIG. 3, for example, the outer block is the original CU. The interior blocks represent the outcome of transform block decomposition according to a quad-tree structure. Of course, such an outcome is just one out of many possible decompositions. In the example of FIG. 3, there are three levels of transform decomposition. With level-1 decomposition, the whole transform block is split into four quarter-sized blocks. Then, at level-2, the second quarter-sized transform block (in the upper right) is further split into four 1/16 sized transform blocks. Then, at level-3, the fourth 1/16 sized transform block is further split into four even smaller transform blocks. A transform unit at level-0 means that the whole coding unit is transformed together without further split. In this case, the transform unit has the same size of the coding unit. In practice, whether a transform unit is further split or not is determined based on rate-distortion optimization.

Figure 4A:
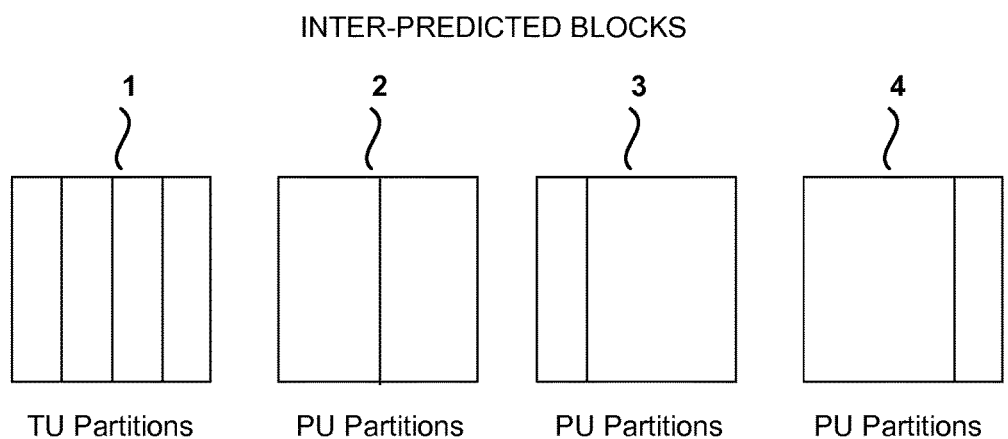
FIG. 4A is a conceptual diagram of example vertically-oriented non-square transform and prediction partitions.

In one proposal for HEVC, in addition to square-shaped transform units (such as those shown in FIG. 3), non-square shaped TUs can also be used. Block 1 of FIG. 4A is a conceptual diagram of example vertically-oriented non-square transform partitions. For example, for an inter-predicted block of size 2N×2N, four transform blocks (which may also be called transform units) in the size of 0.5N×2N may be used, as shown in block 1. Such transforms may be used with a 2N×2N PU partition, or when a PU partition is in the form of blocks 2, 3 or 4. Block 2 is a 2N×2N PU separated into two partitions, each having a size of half the original block size. The partitions in block 2 are sometimes called N×2N partitions. The PUs of blocks 3 and 4 are separated into two partitions with a size of ¼ and ¾ of the original block size, respectively. The left partition of block 3 is sometimes called a 0.5N×2N partition, while the right partition of block 3 is sometimes called a 1.5N×2N partition. Likewise, the left partition of block 4 is sometimes called a 1.5N×2N partition, while the right partition of block 4 is sometimes called a 0.5N×2N partition.

Figure 4B:
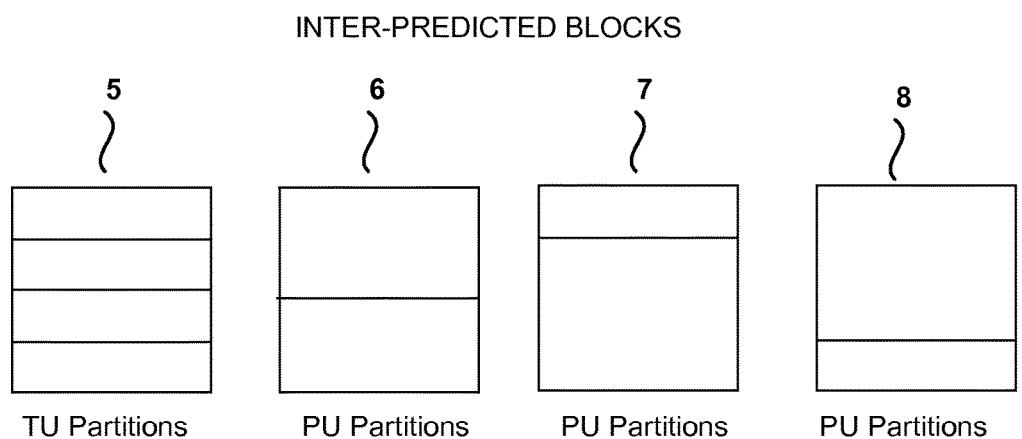
FIG. 4B is a conceptual diagram of example horizontally-oriented non-square transform and prediction partitions.

In FIG. 4A, the partition of the PUs are vertically oriented. Similar TU partitioning may be used when the partitions of the PUs are horizontally oriented, as shown in FIG. 4B. Block 5 of FIG. 4B is a conceptual diagram of example horizontally-oriented non-square transform partitions. For example, for an inter-predicted block of size 2N×2N, four transform blocks (which may also be called transform units) in the size of 2N×0.5N may be used, as shown in block 5. Such transforms may be used with a 2N×2N PU partition, or when a PU partition is in the form of blocks 6, 7 or 8. Block 6 is a 2N×2N PU separated into two partitions, each having a size of half the original block size. The partitions in block 6 are sometimes called 2N×N partitions. The PUs of blocks 7 and 8 are separated into two partitions with a size of ¼ and ¾ of the original block size, respectively. The upper partition of block 7 is sometimes called a 2N×0.5N partition, while the lower partition of block 7 is sometimes called a 2N×1.5N partition. Likewise, the upper partition of block 8 is sometimes called a 2N×1.5N partition, while the lower partition of block 8 is sometimes called a 2N×0.5N partition.

It can be seen that according to HEVC for an inter-predicted block, non-square transforms are used depending on the partition mode of a current block. If the PU is partitioned in a vertically-oriented manner, as shown in blocks 2, 3 and 4 of FIG. 4A, vertically oriented transform blocks may be used. If the PU is partitioned in a horizontally-oriented manner, as shown in blocks 6, 7 and 8 of FIG. 4B, horizontally oriented transform blocks may be used.

Figure 5A:
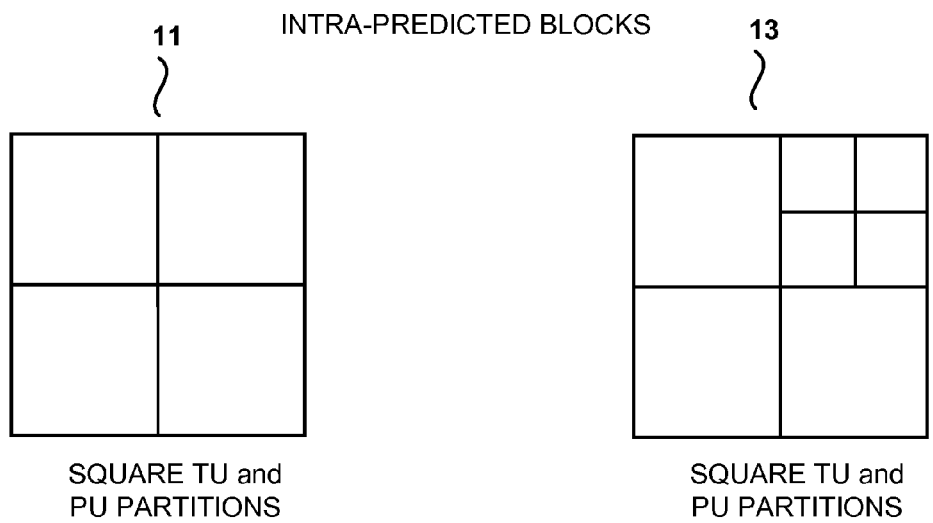
FIG. 5A is a conceptual diagram of example square transform unit partitions for intra-predicted blocks.

As opposed to inter-predicted blocks, previous proposals for HEVC only allowed square-shaped TUs for intra-predicted blocks. In addition, the shape and size of TUs are aligned with the shape and size of the PUs used for an intra-predicted block. Example TUs and PUs for intra-predicted blocks are shown in FIG. 5A. Block 11 is partitioned into four quarter-sized partitions. In block 13, the second quarter-sized partition (in the upper right) is further partitioned into four smaller partitions with a size of 1/16 of the original block size. Based on earlier proposals for HEVC, each block shown in FIG. 5A is predicted, transformed and reconstructed separately. The TU size is the same as the PU size in each case.

Figure 5B:
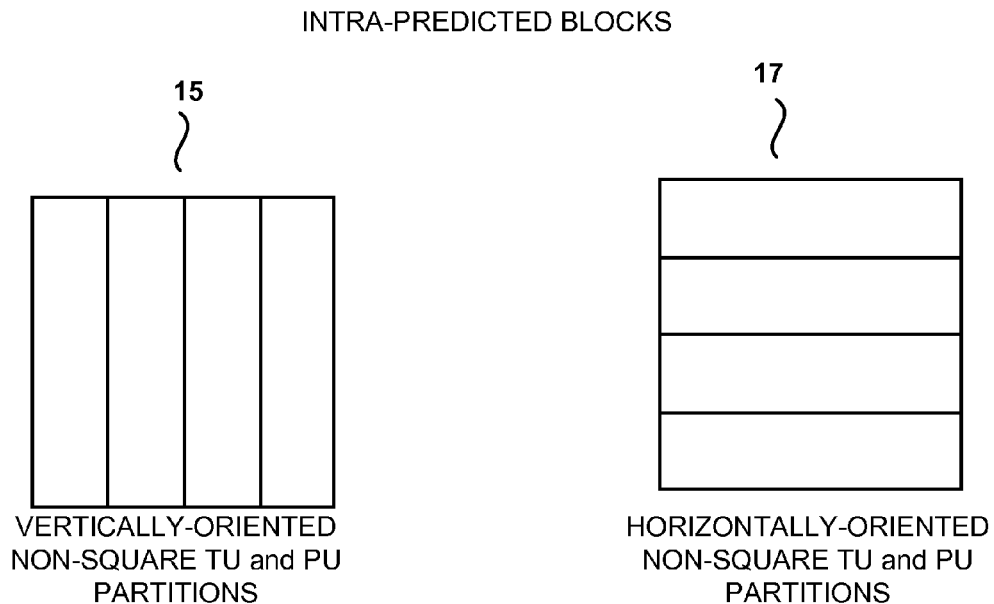
FIG. 5B is a conceptual diagram of example non-square transform unit partitions for intra-predicted blocks.

Recent proposals in HEVC call for the use of non-square transforms in intra-predicted blocks. FIG. 5B depicts examples of non-square TUs and PUs that may be used for intra-predicted blocks. In the example of FIG. 5B, the PUs also may have a rectangular shape. Again, TUs are aligned with the PUs and have the same size and shape. Block 15 shows TUs and PUs with a vertically-oriented rectangular shape and block 17 shows TUs and PUs with a horizontally-oriented rectangular shape. One by one, each partition is predicted from a neighboring block of reconstructed pixels (i.e., predicted using intra-prediction), with prediction residuals transformed using the same size TU as the PU used for prediction.

The example non-square TUs and PUs shown in FIG. 5B may be used in addition to the square-shaped TUs and PUs of FIG. 5A. In other words, for a given block, the cases exemplified in both FIGS. 5A and 5B are allowed. For example, at quadtree decomposition level-1, a transform partition shown in block 11 may be chosen. In another case, a transform partition shown in blocks 15 or 17 may be chosen. At the encoder side, all allowable PU and TU partitions, including those shown in FIGS. 5A and 5B, are tested to determine the partition mode that exhibits the most optimal rate-distortion metric (or that meets a prescribed rate-distortion threshold) and the best partition mode is signaled in the encoded bitstream. Testing has shown that enabling non-square shaped transforms in addition to square shaped-transforms can improve coding efficiency for intra-predicted blocks.

For an intra-predicted block, since the TU is coupled together with the PU, checking different options of TU partitions within a block may involve performing multiple predictions and reconstructions, as each unique TU partition is matched with a unique PU partition. As a result, encoding complexity becomes significantly higher with additional non-square partitions being checked and signaled. This high encoder complexity may make it impractical to use non-square transforms in addition to square transforms for coding an intra-predicted block in some situations. In view of these drawbacks, the current disclosure proposes techniques for enabling non-square transforms for intra-predicted blocks with reduced complexity, while preserving coding efficiency.

This disclosure presents several techniques for addressing these drawbacks. As one example, for a given intra-predicted block, a reduced number of transform unit partition options is allowed, based on certain conditions. In another example, this disclosure proposes decoupling TU size and shape from PU size and shape for intra-predicted blocks. That is, for a given PU, TUs of different sizes and shapes from the PU may be applied. As a result, checking different TU partitions may not require obtaining the corresponding prediction of the block separately in all circumstances.

In accordance with one example of this disclosure, for an intra-predicted block, a reduced number of TU partition options is allowed based on the intra-prediction direction (or intra prediction mode) used for the corresponding PU. For example, if the intra prediction mode of a current PU indicates that the PU is predicted from a vertical direction, e.g., intra-prediction mode 0, only vertically oriented non-square transforms (e.g., TU partitions in block 15 in FIG. 5B) are allowed. Square-shaped transforms are not allowed for a PU predicted using a vertically-oriented intra-prediction mode. In addition, horizontally-oriented non-square TUs (e.g., TU partitions in block 17 in FIG. 5B) are also not allowed. In general, this restriction may be applied to all intra-prediction directions that are mainly vertically oriented, such as modes 0, 21, 22, 11, and 12. Modes 0, 21, 22, 11 and 12 are just example vertically-oriented intra-prediction modes. In other examples, additional intra-prediction modes may be classified as being vertically oriented.

Similarly, according to another example of the disclosure, if the intra-prediction mode of a current PU indicates that the PU is predicted from a horizontal direction, e.g., intra-prediction mode 1, only horizontally-oriented non-square TUs are allowed (e.g., TU partitions in block 17 of FIG. 5B). Square-shaped transforms are not allowed for a PU predicted using a horizontally-oriented intra-prediction mode. In addition, vertically-oriented non-square TUs (e.g., TU partitions in block 15 of FIG. 5B) are also not allowed. In general, this restriction may be applied to all intra-prediction directions that are mainly horizontally oriented, such as modes 1, 29, 30, 15, and 16. Modes 1, 29, 30, 15 and 16 are just example horizontally-oriented intra-prediction modes. In other examples, additional intra-prediction modes may be classified as being horizontally oriented.

In another example of the disclosure, if the intra-prediction mode for a current PU does not have any obvious direction preference, e.g., DC mode 2 or planar mode 34, only square-shaped TUs are allowed for the block. In general, this restriction may be applied to all intra-prediction directions that are neither horizontally nor vertically oriented. For example, the restriction to square-shaped TUs may also be applied to those intra-prediction directions that are mainly diagonally oriented, such as modes 3, 18, and 26. Modes 3, 18, and 26 are just example diagonally-oriented intra-prediction modes. In other examples, additional intra-prediction modes may be classified as being diagonally oriented.

Other intra-prediction modes, such as those shown in FIG. 2, that are not specifically mentioned above may have no restrictions on the types of TU partitions that are allowable. For example, square TU partitions, non-square vertically-oriented TU partitions, and non-square horizontally-oriented TU partitions may be allowed.

The above-described intra-prediction mode based TU partition restrictions (i.e., a restriction of certain TU partitions to each intra-prediction mode) can be made at the mode decision stage (i.e., selecting the intra-prediction mode) or can be used for the whole encoding process (i.e., both at the mode decision stage and at the entropy coding stage).

A mode decision stage (e.g., mode select 40 unit of FIG. 7) refers to the stage where the encoder tests the possible TU partitions and selects one based on a bit rate/distortion criterion. If the TU restriction is applied only at the mode decision stage, video encoder 20 only tests the selected TUs (which may be a subset of all possible TUs) that are allowed for the selected intra-prediction mode. At the entropy coding stage (e.g., entropy encoding unit 56 of FIG. 7), video encoder 20 considers all possible TUs, not just the subset allowed for the selected intra-prediction, as available for signaling. For example, suppose there are three total possible TU partitions (e.g., vertically-oriented (partition A), horizontally-oriented (partition B) and square (partition C)). Suppose for an intra-mode k, transform A is only allowed for consideration at the mode decision stage. However, at the entropy coding stage, video encoder 20 assumes all of partitions A, B, and C are available, and therefore signals the selection of partition A in view of all these possibilities. For example, video encoder 20 may signal a square_tranform_flag=1 to indicate partition C is selected, or may signal a square_transform_flag=0 to indicate a non-square transform (i.e., A or B) and a transform_dir_flag=1 (or 0) to indicate which of transforms A or B is selected. The syntax element transform_dir_flag=1 may correspond to a horizontally-oriented TU, while transform_dir_flag=0 may correspond to a vertically-oriented TU, and vice versa.

Applying the TU partition restriction to the whole encoding process means that the restriction of available transforms is applied to both the mode decision stage (as described above) and also to the entropy coding stage. In the entropy coding stage, only the allowed transforms for the selected intra-prediction mode are considered when signaling the TU partition selection. For example, if for intra-mode k, only transforms A and C are allowed (B is not allowed), video encoder 20 signals one flag (flag=1, A selected; flag=0, C selected). In another example, if for mode k, only transform A is allowed, video encoder 20 will not need to send any flags, as the transform may be inferred at the decoder from the intra mode.

According to one example of the present disclosure, the TU partition(s) available for use are dependent on the intra-prediction mode that is selected for use at video encoder 20. In this example, for each intra-prediction mode, only one TU partition is specified. The type of TU partitions that are available may include square TU partitions, vertically-oriented non-square TU partitions and horizontally-oriented non-square TU partitions.

The dependency between intra-prediction mode and the TU partition may be made available at both video encoder 20 and video decoder 30, e.g., in the form of a mapping table stored in memory, or as a set of implemented formulas or rules. As a result, in this example, there is no need to signal the type of TU partition used from encoder to decoder. Instead, at video decoder 30, once the intra-prediction mode of a block or PU is decoded, its dependent TU partition can be determined in the same manner as at the encoder, i.e., from a mapping table or rule based on the intra-prediction mode.

According to another example of the present disclosure, the TU partition selected is still dependent on the selected intra prediction mode of a current block/PU, however, for each prediction direction, there may be one or more TU partitions specified and allowed. When there are more than one TU partition specified for a certain intra-prediction mode, in addition to signaling the selected intra-prediction mode in the encoded video bitstream, an additional bit or flag is also signaled to indicate which TU partition specified for the selected intra-prediction mode is to be used. For example, for a vertical prediction directions (e.g., mode 0), either vertically oriented non-square TU partitions or square TU partitions may be used. For horizontally-oriented prediction directions (e.g., mode 1), either horizontally-oriented non-square TU partitions or square TU partition may be used.

In this context, signaling the TU partition in the encoded bitstream does not require real-time transmission of such elements from the encoder to a decoder, but rather means that such syntax elements are encoded into the bitstream and are made accessible to the decoder in any fashion. This may include real-time transmission (e.g., in video conferencing) as well as storing the encoded bitstream on a computer-readable medium for future use by a decoder (e.g., in streaming, downloading, disk access, card access, DVD, Blu-ray, etc.).

If, for an intra-prediction mode, there is only one TU partition specified, there is no need to signal an additional bit or flag to indicate the TU partition from encoder to decoder when such an intra-prediction mode is used. Instead, the associated TU partition can be inferred at both encoder and decoder. For example, under DC mode or planar mode, only square TU partitions may be made available to use. Again, the dependency between intra-prediction mode, the number of allowed TU partitions, as well as the type of allowed TU partitions may be made available at both encoder and decoder, e.g., in the form of a mapping table stored in memory, or as a set of implemented formulas or rules.

According to yet another example of the present disclosure, the TU partition selected is still dependent on intra prediction mode of a current block, however, for each intra-prediction direction, there are the same number of TU partitions specified and allowed. For example, for each prediction mode, there are two TU partitions specified and allowed.

The motivation of doing so is to avoid a parsing issue associated with the scheme of the second example when an entropy coder such as CABAC is used. According to the second example described above, depending on intra-prediction mode, there may or may not be a need to send an additional bit or flag indicating the transform partition. At video decoder 30, in order to know whether to parse the additional one bit or flag for a current block, the intra-prediction mode of the block has to be fully decoded. This may incur problems at the decoder when an entropy coder such as CABAC is used.

In the example where every intra-prediction mode has the same number of TU partitions specified (e.g., two TU partitions), regardless of which intra-prediction mode is selected, one additional bit or flag is signaled to indicate the TU partition used for the block/PU. So, the parsing of this additional bit or flag at decoder side is not dependent on the actual intra-prediction mode of the block, as the additional bit of flag will always be sent.

Figure 6:
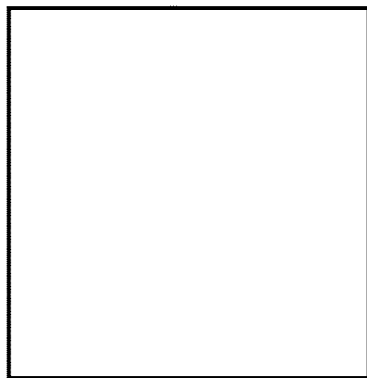
FIG. 6 is a conceptual diagram of example prediction units for intra-prediction.
Figure 6:
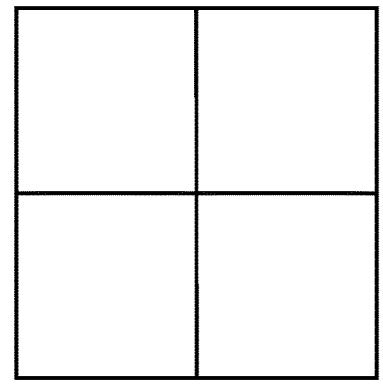

According to another example of the present disclosure, for an intra-predicted block, TUs are no longer coupled with PUs in terms for size and/or shape. In other words, a TU may have different size and/or shape from the corresponding PU. For example, as shown in FIG. 6, PU 19 of an intra-predicted block having a 2N×2N partitioning mode may have the same size as the CU. Each partition of PU 21 of an intra-predicted block with an N×N partitioning mode may have a size that is one quarter of the CU size.

For each PU, intra-prediction is performed first using neighboring blocks of reconstructed pixels, regardless of what TU partition is to be used for the PU. Once prediction residuals are available for a PU, TU partitions within the PU may be further determined and signaled.

With such a technique, since TUs and PUs are no longer coupled together, prediction residuals remain unchanged regardless of what TU partition is for a particular PU. As a result, at the encoder side, different TU partitions may be tested without re-calculating the prediction and prediction residuals each time. As such, encoder complexity can be reduced.

For example, when using the partitioning of PU 19 in FIG. 6, the prediction direction for the whole CU is obtained first. After that, the residual is calculated for the whole CU. Then, based on the prediction residual, different TU partitions as shown in FIGS. 4A and 4B can be tested and the best one is signaled in the encoded video bitstream.

According to yet another example of the present disclosure, for an intra-predicted block, TUs are not coupled with PUs. In other words, a TU may have different size or shape from the corresponding PU. However, depending on the intra-prediction mode selected, a reduced number of TU partitions may be allowed.

For example, for a given intra-prediction mode, certain TU partitions may be very unlikely result in the most optimal rate-distortion metric. In this case, reducing the number of allowed pTU partitions by eliminating unlikely used TU partitions for a given intra-prediction mode may reduce the signaling overhead for TU partitions and improve coding efficiency.

When there is more than one option of TU partitions available for a given intra-prediction mode, the index of the best TU partition for a current block/PU is signaled in the encoded video bitstream. For example, when there are three options of TU partitions available for a particular intra-prediction mode, an index value of 0, 1 or 2 may be signaled to indicate, respectively, which TU partition is selected for the block/PU.

To improve the coding efficiency in signaling such an index value, the intra-prediction mode of a current block may be used as context. Depending on the intra-prediction mode, different probability models used in adaptive coding (e.g., CABAC) may be used in signaling the index value of TU partition. That is, for a given intra-prediction mode, the TU partitions that have shown to have a higher likelihood of having the best rate-distortion metric will be coded using CABAC with a probability model that takes into consideration this higher likelihood. According to another example of the disclosure, the index value of a TU partition used for a neighboring block of the current block may be used as a context in coding the index value of transform unit partition for the current block.

According to other examples of the disclosure, techniques for signaling non-square PUs are described. In particular, this disclosure describes techniques for decreasing encoded video bit rate and for reducing encoder complexity by reducing the intra-mode sets for non-square short distance intra-prediction partitions.

As discussed above, previous block-based intra-coding in HEVC, H.264 and other video coding standards uses one N×N square block as the reconstruction unit and prediction unit. The pixels inside a square block are predicted from the boundaries of neighboring reconstructed blocks. This may result in less than optimal predictions for pixels on the right-bottom part of the square blocks than the others in some regions of sequences. To better exploit spatial correlations, the short distance intra-prediction (SDIP) coding scheme has recently been proposed for use in the HEVC standard. SDIP techniques include partitioning one N×N square block into several lines or non-square blocks with rectangular shapes. In the block, pixels are predicted and reconstructed line by line or rectangle by rectangle. Therefore, the prediction distance is shortened.

In one example of SDIP, one N×N square block that is smaller than 32×32 is divided into several lines of pixels or non-square blocks with a non-square rectangular shape. In the block, pixels are predicted and reconstructed line by line or rectangle by rectangle.

In another example of SDIP, one CU that is smaller than 64×64 can be partitioned as lines or non-square blocks with a rectangular shape. For example, a 32×32 CU can be partitioned as four 8×32 PUs or four 32×8 PUs. In another example, a 16×16 CU can not only be divided into four 8×8 PUs, but also be divided into four 4×16/16×4 PUs, and a 4×16/16×4 PU can be further split into four 1×16/16×1 partitions. Similarly, one 8×8 CU can also be divided into four 2×8/8×2 PUs, and every 4×4 PU can be further divided into four 1×4/4×1 partitions.

More generally speaking, for an intra CU of size 2N×2N, there are two PU sizes previously used in HEVC: 2N×2N and N×N (currently N×N is only allowed at smallest CU level). Example, 2N×2N and N×N partitions are shown in FIG. 5. With the 2N×2N partition 19, the whole CU has only one PU (of size 2N×2N). With the introduction of SDIP, two new prediction units are added: 2N×hN and hN×2N. For a 2N×hN partition, a CU has 4 2N×hN PUs and for hN×2N, the CU has 4 hN×2N PUs. Each PU has its own intra-prediction mode (i.e., one of the 35 modes as shown in FIG. 2). Block 17 of FIG. 4B shows example 2N×hN PU partitions. Block 15 of FIG. 4B shows example hN×2N PU partitions.

When using non-square PUs, for example, with SDIP, each PU may use one of a plurality of intra-prediction modes/directions (e.g., the 35 modes of FIG. 2). There are several drawbacks to this arrangement. First, to signal the selected mode to a decoder for each PU, an index for the selected mode is signaled in the encoded video bitstream. Since the uncertainty or which mode is selected is high (i.e., there may be 35 modes) a relatively large number of bits is used to encode the index, which increases the bit rate for the compressed video. Second, an encoder may have to check every mode to determine the best one to use, or at least to identify a mode that satisfies a requirement, e.g., a rate-distortion threshold. With all intra-prediction modes/directions allowed for each PU, this checking process increases the computational burden at the encoder.

This disclosure proposes techniques for decreasing encoded video bit rate and for reducing encoder complexity by reducing the number of possible intra-prediction modes for square and non-square SDIP partitions. Such a reduction in the number of possible intra-prediction modes is based on observations that, for vertically partitioned CUs (e.g., an hN×2N PU), vertical or nearly vertical intra-prediction modes (e.g., modes 1, 22, 23 . . . ) are more likely to be selected as the best mode. Similarly, for horizontally partitioned CUs (e.g., a 2N×hN PU), horizontal or nearly horizontal intra-prediction modes (e.g., modes 2, 30, 31 . . . ) are more likely to be selected as the best mode.

In this disclosure, SDIP partition dependent intra-prediction mode sets are proposed. The intra-prediction mode sets of SDIP PU partitions (e.g., 2N×hN and hH×2N partitions) may be different from intra-prediction mode sets used for square PU partitions (e.g., 2N×2N and N×N partitions). For example, the intra-prediction mode set of an SDIP PU partition may be a subset of the total number of modes (e.g., 35 modes of FIG. 2) available for square PU partitions. In other words, the intra-prediction mode set of a SDIP PU partition may include fewer modes than an intra-prediction mode set used for square PU partitions. Furthermore, the intra-prediction mode sets may be dependent on the SDIP partition direction. For example, vertically partitioned hN×2N partitions and horizontally partitioned 2N×hN partitions may have different intra-prediction mode sets.

By reducing the amount of intra-prediction modes in a given set for certain SDIP partitions, the codeword used to encode the selected intra-prediction mode can be shorter, and thus bits can be saved and bit rate can be reduced. In addition, since fewer intra-prediction modes are checked for SDIP partitions, the computational burden on the encoding process is reduced and encoding may be accelerated. By making the intra-prediction mode set dependent on the SDIP partition direction, it is expected that most of the encoding gain offered by the full complement of 35 intra-prediction modes can be kept with the selected intra-prediction mode candidates (i.e., the reduced intra-prediction mode set).

In one example of the disclosure, for the hN×2N PU partition, the intra-prediction mode set can include those vertical or nearly vertical intra-prediction modes, including intra-prediction modes 0, 21, 22, 11, and 12, but excludes other intra-prediction modes (e.g., horizontal or nearly horizontal modes, DC modes, planar modes, and other angular modes). For the 2N×hN PU, the intra-prediction mode set can include those horizontal or nearly horizontal intra-prediction modes, including modes 1, 29, 30, and 16, but excludes other intra-prediction modes (e.g., vertical or nearly vertical modes, DC modes, planar modes, and other angular modes).

In another example of the disclosure, for the hN×2N PU partition, the intra-prediction mode set can include those vertical or nearly vertical intra-prediction modes as well as other modes that do not have a strong directionality (e.g., the DC mode and/or planar mode), but excludes other intra-prediction modes (e.g., horizontal or nearly horizontal modes and other angular modes). Modes with strong directionality are those modes that are vertical or nearly vertical and modes that are horizontal or nearly horizontal. For the 2N×hN PU partition, the intra-prediction mode set can include those horizontal or nearly horizontal intra-prediction modes as well as other modes that do not have strong directionality (e.g., the DC mode and/or planar mode), but excludes other intra-prediction modes (e.g., vertical or nearly vertical modes and other angular modes).

In another example of the disclosure, for the hN×2N PU partition, the intra-prediction mode set can include those vertical or nearly vertical intra modes, other modes which do not have strong directionality (e.g., the DC mode and/or planar mode), and some horizontal or nearly horizontal modes (e.g., mode 2). The total number of modes in this intra-mode set can be smaller than the total number of modes for square partitions (e.g., all 35 modes). For the 2N×hN PU partition, the intra-prediction mode set can include those horizontal or nearly horizontal intra modes, other modes which do not have strong directionality (e.g., the DC mode and/or planar mode), and some vertical or nearly vertical modes (e.g., mode 1). The total number of modes in this intra-mode set can be smaller than the total number of modes for square partitions (e.g., smaller than a set including all 35 modes).

This disclosure also proposes techniques for making the available intra-prediction mode set for a particular PU partition also dependent on the CU size. For example, a 32×32 CU with an hN×2N SDIP PU partition may have a different intra-mode set than a 16×16 CU with an hN×2N SDIP PU partition. In this example, for the 32×32 CU (with an hN×2N SDIP PU partition), the intra mode sets include mode 0, 21 and 22; for the 16×16 CU (with an hN×2N SDIP PU partition), the intra mode sets include mode 0, 21, 22, 11, 12, 20 and 23. Also, the intra-prediction mode set may also be dependent on other side information, like picture type. For example, for intra slice/picture, the intra-prediction mode set of a CU with hN×2N SDIP PU partition includes mode 0, 21, 22, 11, 12, 20 and 23. For P or B slices, the intra-prediction mode set of a CU with hN×2N SDIP PU partition includes all the 35 modes.

In some examples, the intra-prediction mode sets for SDIP partitions may be fixed sets, and may be stored at both video encoder 20 and video decoder 30. In other examples, the intra-prediction mode sets may also be signaled in the encoded bitstream using some high level syntax. For example, such syntax may be signaled in the SPS (sequence parameter set) and/or the PPS (picture parameter set).

In another example of the disclosure, the modes in the SDIP intra-prediction mode sets may be renumbered (e.g., starting consecutively from 0) such that entropy coding can be easier and more efficient. For example, suppose the intra-prediction mode set for an hN×2N partition includes 3 modes: 0, 21 and 22 (as shown in FIG. 2). Modes 0, 21, and 22 may be renumbered as 0, 1, and 2 (e.g., 0→0, 21→1, 22→2) for entropy coding. At video decoder 30, the renumbered intra-prediction modes can be remapped to the original mode numbers (0, 21 and 22 in this example) such that intra-prediction with correct direction can be performed.

Most probable modes (MPM) are used to signal intra-prediction modes. In one version of the HM software, there are two MPMs. One MPM is the mode of the top PU (i.e., the PU directly above the current PU), and the other MPM is the mode of the left PU (i.e., the PU directly to the left of the current PU). A flag is signaled in the encoded video bitstream if the mode of the current PU is the same as the mode of one of the MPM PUs. If it is true, another flag will be signaled in the encoded video bitstream to indicate which MPM the mode of the current PU matches. Using MPM signaling techniques reduces the amount of bits needed to signal a selected intra-prediction mode for a PU.

As proposed in this disclosure, the two SDIP PUs (i.e., hN×2N and 2N×hN) and the square PUs can have different intra-prediction mode sets. This may cause some problems and/or inefficiencies in MPM-based intra-prediction mode signaling. For example, if the left PU and the top PU have intra-prediction mode sets that are different from that of the current PU, it is possible that the MPMs derived from left and top PU are different from any intra-prediction mode available to the current PU, and thus, MPM coding becomes not useful.

In view of this drawback, the disclosure further proposes to perform mode mapping/quantization when the mode of a PU(A) is used as the MPM for another PU(B) in the case that intra-prediction mode sets for PUs A and B are different. Define S(A) as the intra-prediction mode set of PU(A) and define m(A) as the mode used for PU(A). Similarly, define S(B) as the intra-prediction mode set of PU(B) and define m(B) as the mode used for PU(B). Mapping may be performed to map m(A) to a mode Y in S(B), and Y is used as the MPM for encoding m(B). Video encoder 20 may perform this forward mapping. In addition, video decoder 30 may also perform a forward mapping to obtain the original intra-prediction mode.

In one example, Y is defined as the mode in S(B) that has the most similar direction as m(A). In another example, the mapping for modes in S(A) to modes in S(B) are fixed and available at both the encoder and the decoder. In another example, the mapping for modes in S(A) to modes in S(B) are encoder-defined and transmitted using some high level syntax (e.g., in the SPS or the PPS). That is, mapping is performed at the encoder according to a mapping algorithm, and the algorithm (or an index for the algorithm) used to perform the mapping is signaled in the encoded video bitstream. In another example, the mapping for modes in S(A) to modes in S(B) are dependent on side information (e.g., CU/PU size, picture type, etc.).

Figure 7:
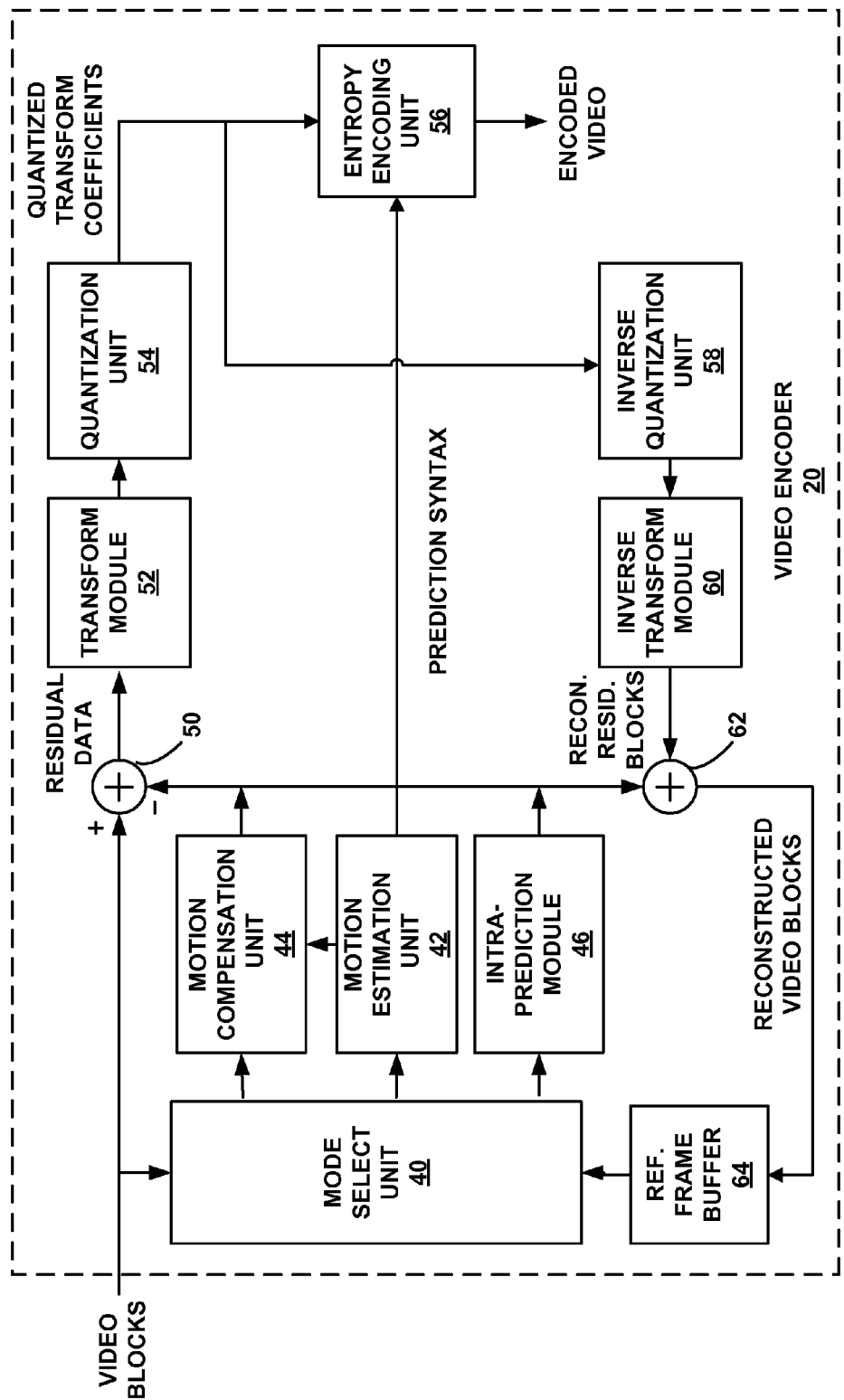
FIG. 7 is a block diagram illustrating an example video encoder that operates according to examples of this disclosure.

FIG. 7 is a block diagram illustrating an example of video encoder 20 that may use techniques for TU and PU selection and signaling as described in this disclosure. Video encoder 20 will be described in the context of HEVC coding for purposes of illustration, but without limitation of this disclosure as to other coding standards or methods that may require coding of transform coefficients. Video encoder 20 may perform intra- and inter-coding of CUs within video frames. Intra-coding relies on spatial prediction to reduce or remove spatial redundancy in video data within a given video frame. Inter-coding relies on temporal prediction to reduce or remove temporal redundancy between a current frame and previously coded frames of a video sequence. Intra-mode (I-mode) may refer to any of several spatial-based video compression modes. Inter-modes such as uni-directional prediction (P-mode) or bi-directional prediction (B-mode) may refer to any of several temporal-based video compression modes.

As shown in FIG. 7, video encoder 20 receives a current video block within a video frame to be encoded. In the example of FIG. 7, video encoder 20 includes motion compensation unit 44, motion estimation unit 42, intra-prediction module 46, reference frame buffer 64, summer 50, transform module 52, quantization unit 54, and entropy encoding unit 56. For video block reconstruction, video encoder 20 also includes inverse quantization unit 58, inverse transform module 60, and summer 62. A deblocking filter or other in-loop filters (not shown in FIG. 7) may also be included to filter block boundaries to remove blockiness artifacts from reconstructed video. If desired, the deblocking filter would typically filter the output of summer 62.

Mode select unit 40 may select one of the coding modes, intra or inter, e.g., based on a rate distortion analysis for each mode, and provides the resulting intra- or inter-predicted block (e.g., a prediction unit (PU)) to the summer 50 to generate residual block data and to summer 62 to reconstruct the encoded block for use in a reference frame. Summer 62 combines the predicted block with inverse quantized, inverse transformed data from inverse transform module 60 for the block to reconstruct the encoded block, as described in greater detail below. Some video frames may be designated as I-frames, where all blocks in an I-frame are encoded in an intra-prediction mode. In some cases, the intra-prediction module 46 may perform intra-prediction encoding of a block in a P- or B-frame, e.g., when motion search performed by the motion estimation unit 42 does not result in a sufficient prediction of the block.

During the encoding process, video encoder 20 receives a video frame or slice to be coded. The frame or slice may be divided into multiple video blocks, e.g., largest coding units (LCUs). Motion estimation unit 42 and motion compensation unit 44 perform inter-predictive coding of the received video block relative to one or more blocks in one or more reference frames to provide temporal compression. Intra-prediction module 46 may perform intra-predictive coding of the received video block relative to one or more neighboring blocks in the same frame or slice as the block to be coded to provide spatial compression.

Motion estimation unit 42 and motion compensation unit 44 may be highly integrated, but are illustrated separately for conceptual purposes. Motion estimation (or motion search) is the process of generating motion vectors, which estimate motion for video blocks. A motion vector, for example, may indicate the displacement of a prediction unit in a current frame relative to a reference sample of a reference frame. Motion estimation unit 42 calculates a motion vector for a prediction unit of an inter-coded frame by comparing the prediction unit to reference samples of a reference frame stored in reference frame buffer 64. A reference sample may be a block that is found to closely match the portion of the CU including the PU being coded in terms of pixel difference, which may be determined by sum of absolute difference (SAD), sum of squared difference (SSD), or other difference metrics. The reference sample may occur anywhere within a reference frame or reference slice, and not necessarily at a block (e.g., coding unit) boundary of the reference frame or slice. In some examples, the reference sample may occur at a fractional pixel position.

Motion estimation unit 42 sends the calculated motion vector to entropy encoding unit 56 and motion compensation unit 44. The portion of the reference frame identified by a motion vector may be referred to as a reference sample. Motion compensation unit 44 may calculate a prediction value for a prediction unit of a current CU, e.g., by retrieving the reference sample identified by a motion vector for the PU.

Intra-prediction module 46 may perform intra-prediction on the received block, as an alternative to inter-prediction performed by motion estimation unit 42 and motion compensation unit 44. Intra-prediction module 46 may predict the received block relative to neighboring, previously coded blocks, e.g., blocks above, above and to the right, above and to the left, or to the left of the current block, assuming a left-to-right, top-to-bottom encoding order for blocks. Intra-prediction module 46 may be configured to perform intra-prediction according to one of a variety of different intra-prediction modes. For example, intra-prediction module 46 may be configured with a certain number of directional prediction modes, e.g., thirty-five directional prediction modes, based on the size of the CU being encoded.

The intra-prediction module 46 may select an intra-prediction mode by, for example, calculating error values for various intra-prediction modes and selecting a mode that yields the lowest error value. Directional prediction modes may include functions for combining values of spatially neighboring pixels and applying the combined values to one or more pixel positions in a PU. Once values for all pixel positions in the PU have been calculated, a predictive block for the PU is obtained and the intra-prediction module 46 may calculate an error value for the prediction mode based on pixel differences between the predictive block and the received block to be encoded. The intra-prediction module 46 may continue testing intra-prediction modes until an intra-prediction mode that yields an acceptable error value is discovered. The intra-prediction module 46 may then send the predictive block to the summer 50.

Video encoder 20 forms a residual block by subtracting the prediction data calculated by motion compensation unit 44 or intra-prediction module 46 from the original video block being coded. Summer 50 represents the component or components that perform this subtraction operation. The residual block may correspond to a two-dimensional matrix of pixel difference values, where the number of values in the residual block is the same as the number of pixels in the predictive block corresponding to the residual block. The values in the residual block may correspond to the differences, i.e., error, between values of co-located pixels in the predictive block and in the original block to be coded. The differences may be chroma or luma differences depending on the type of block that is coded.

Transform module 52 may form one or more TUs from the residual block. Transform module 52 selects a transform from among a plurality of transforms. The transform may be selected based on one or more coding characteristics, such as block size, coding mode, or the like. Transform module 52 then applies the selected transform to the TU, producing a video block comprising a two-dimensional array of transform coefficients. Transform module 52 may select the transform partition according to above-described techniques of this disclosure. In addition, transform module 52 may signal the selected transform partition in the encoded video bitstream.

Transform module 52 may send the resulting transform coefficients to quantization unit 54. Quantization unit 54 may then quantize the transform coefficients. Entropy encoding unit 56 may then perform a scan of the quantized transform coefficients in the matrix according to a scanning mode. This disclosure describes entropy encoding unit 56 as performing the scan. However, it should be understood that, in other examples, other processing units, such as quantization unit 54, could perform the scan.

Once the transform coefficients are scanned into the one-dimensional array, entropy encoding unit 56 may apply entropy coding such as CAVLC, CABAC, syntax-based context-adaptive binary arithmetic coding (SBAC), or another entropy coding methodology to the coefficients.

To perform CAVLC, entropy encoding unit 56 may select a variable length code for a symbol to be transmitted. Codewords in VLC may be constructed such that relatively shorter codes correspond to more likely symbols, while longer codes correspond to less likely symbols. In this way, the use of VLC may achieve a bit savings over, for example, using equal-length codewords for each symbol to be transmitted.

To perform CABAC, entropy encoding unit 56 may select a context model to apply to a certain context to encode symbols to be transmitted. The context may relate to, for example, whether neighboring values are non-zero or not. The entropy encoding unit 56 may also entropy encode syntax elements, such as the signal representative of the selected transform. In accordance with the techniques of this disclosure, entropy encoding unit 56 may select the context model used to encode these syntax elements based on, for example, an intra-prediction direction for intra-prediction modes, a scan position of the coefficient corresponding to the syntax elements, block type, and/or transform type, among other factors used for context model selection.

Following the entropy coding by entropy encoding unit 56, the resulting encoded video may be transmitted to another device, such as video decoder 30, or archived for later transmission or retrieval.

In some cases, entropy encoding unit 56 or another unit of video encoder 20 may be configured to perform other coding functions, in addition to entropy coding. For example, entropy encoding unit 56 may be configured to determine coded block pattern (CBP) values for CU's and PU's. Also, in some cases, entropy encoding unit 56 may perform run length coding of coefficients.

Inverse quantization unit 58 and inverse transform module 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference frame buffer 64. The motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference frame buffer 64. Reference frame buffer 64 is sometimes called a decoded picture buffer (DPB). The reconstructed video block may be used by motion estimation unit 42 and motion compensation unit 44 as a reference block to inter-code a block in a subsequent video frame.

Figure 8:
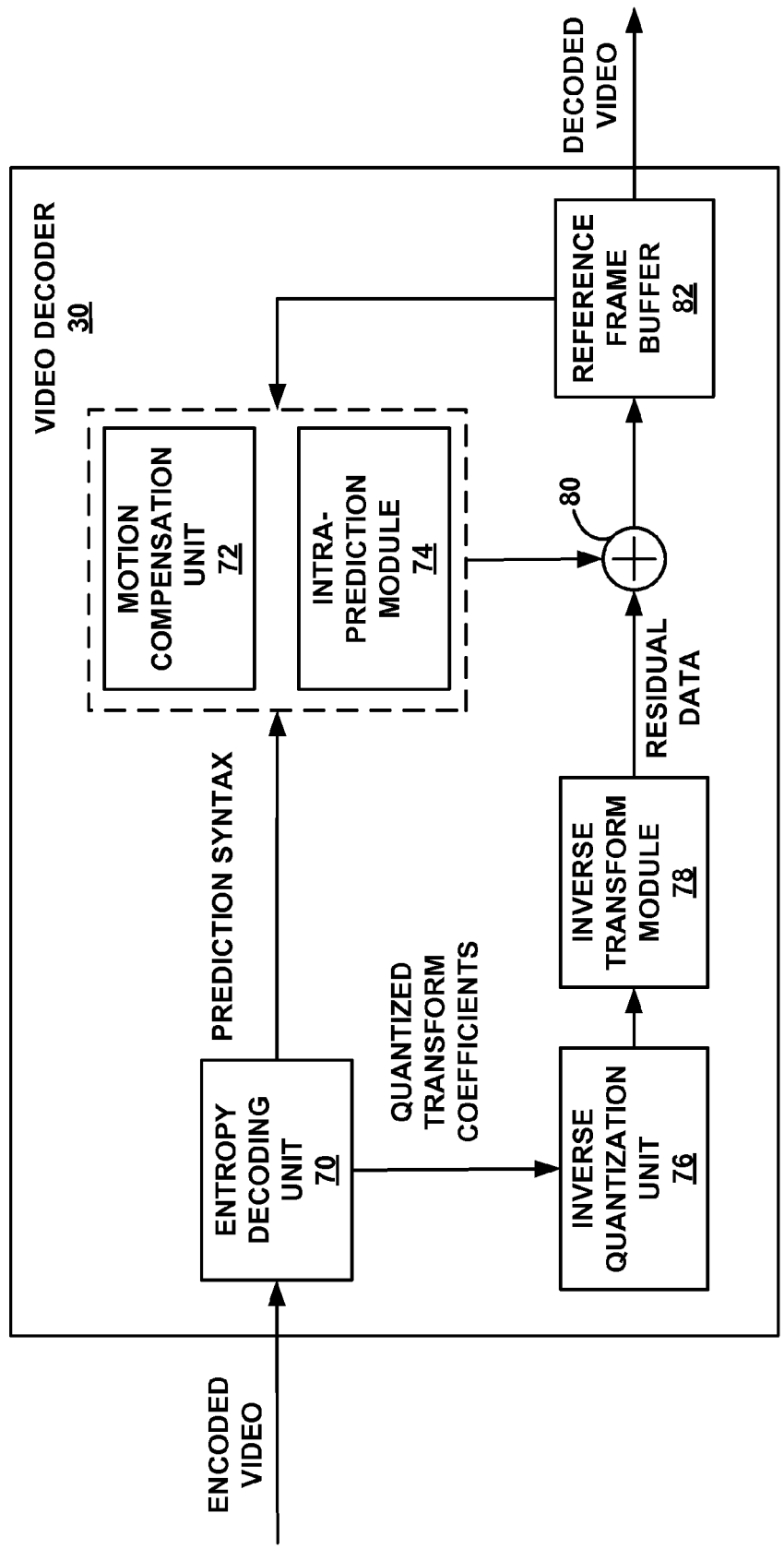
FIG. 8 is a block diagram illustrating an example video decoder that operates according to examples of this disclosure.

FIG. 8 is a block diagram illustrating an example of video decoder 30, which decodes an encoded video sequence. In the example of FIG. 8, video decoder 30 includes entropy decoding unit 70, motion compensation unit 72, intra-prediction module 74, inverse quantization unit 76, inverse transformation unit 78, reference frame buffer 82 and summer 80. Video decoder 30 may, in some examples, perform a decoding pass generally reciprocal to the encoding pass described with respect to video encoder 20 (see FIG. 7).

Entropy decoding unit 70 performs an entropy decoding process on the encoded bitstream to retrieve a one-dimensional array of transform coefficients. The entropy decoding process used depends on the entropy coding used by video encoder 20 (e.g., CABAC, CAVLC, etc.). The entropy coding process used by the encoder may be signaled in the encoded bitstream or may be a predetermined process.

In some examples, entropy decoding unit 70 (or inverse quantization unit 76) may scan the received values using a scan mirroring the scanning mode used by entropy encoding unit 56 (or quantization unit 54) of video encoder 20. Although the scanning of coefficients may be performed in inverse quantization unit 76, scanning will be described for purposes of illustration as being performed by entropy decoding unit 70. In addition, although shown as separate functional units for ease of illustration, the structure and functionality of entropy decoding unit 70, inverse quantization unit 76, and other units of video decoder 30 may be highly integrated with one another.

Inverse quantization unit 76 inverse quantizes, i.e., de-quantizes, the quantized transform coefficients provided in the bitstream and decoded by entropy decoding unit 70. The inverse quantization process may include a conventional process, e.g., similar to the processes proposed for HEVC or defined by the H.264 decoding standard. The inverse quantization process may include use of a quantization parameter QP calculated by video encoder 20 for the CU to determine a degree of quantization and, likewise, a degree of inverse quantization that should be applied. Inverse quantization unit 76 may inverse quantize the transform coefficients either before or after the coefficients are converted from a one-dimensional array to a two-dimensional array.

Inverse transform module 78 applies an inverse transform to the inverse quantized transform coefficients. In some examples, inverse transform module 78 may determine an inverse transform based on signaling from video encoder 20, or by inferring the transform from one or more coding characteristics such as block size, coding mode, or the like. In some examples, inverse transform module 78 may determine a transform to apply to the current block based on a signaled transform at the root node of a quadtree for an LCU including the current block. Alternatively, the transform may be signaled at the root of a TU quadtree for a leaf-node CU in the LCU quadtree. In some examples, inverse transform module 78 may apply a cascaded inverse transform, in which inverse transform module 78 applies two or more inverse transforms to the transform coefficients of the current block being decoded.

In addition, inverse transform module 74 may apply the inverse transform to produce a transform unit partition in accordance with the above-described techniques of this disclosure. That is, inverse transform module 74 may apply transform to square and non-square TU partitions as signaled according to the techniques of this disclosure.

Intra-prediction module 74 may generate prediction data for a current block of a current frame based on a signaled intra-prediction mode and data from previously decoded blocks of the current frame.

Based on the retrieved motion prediction direction, reference frame index, and calculated current motion vector, the motion compensation unit produces a motion compensated block for the current portion. These motion compensated blocks essentially recreate the predictive block used to produce the residual data.

Motion compensation unit 72 may produce the motion compensated blocks, possibly performing interpolation based on interpolation filters. Identifiers for interpolation filters to be used for motion estimation with sub-pixel precision may be included in the syntax elements. Motion compensation unit 72 may use interpolation filters as used by video encoder 20 during encoding of the video block to calculate interpolated values for sub-integer pixels of a reference block. Motion compensation unit 72 may determine the interpolation filters used by video encoder 20 according to received syntax information and use the interpolation filters to produce predictive blocks.

Additionally, motion compensation unit 72 and intra-prediction module 74, in an HEVC example, may use some of the syntax information (e.g., provided by a quadtree) to determine sizes of LCUs used to encode frame(s) of the encoded video sequence. Motion compensation unit 72 and intra-prediction module 74 may also use syntax information to determine split information that describes how each CU of a frame of the encoded video sequence is split (and likewise, how sub-CUs are split). In particular, intra-prediction module 74 may use a reduced number of intra-prediction modes to perform intra-prediction on non-square SDIP PU partitions, as described above in this disclosure. The syntax information may also include modes indicating how each split is encoded (e.g., intra- or inter-prediction, and for intra-prediction an intra-prediction encoding mode), one or more reference frames (and/or reference lists containing identifiers for the reference frames) for each inter-encoded PU, and other information to decode the encoded video sequence.

Summer 80 combines the residual blocks with the corresponding predictive blocks generated by motion compensation unit 72 or intra-prediction module 74 to form decoded blocks. If desired, a deblocking filter may also be applied to filter the decoded blocks in order to remove blockiness artifacts. The decoded video blocks are then stored in reference frame buffer 82, which provides reference blocks for subsequent motion compensation and also produces decoded video for presentation on a display device (such as display device 32 of FIG. 1).

Figure 9:
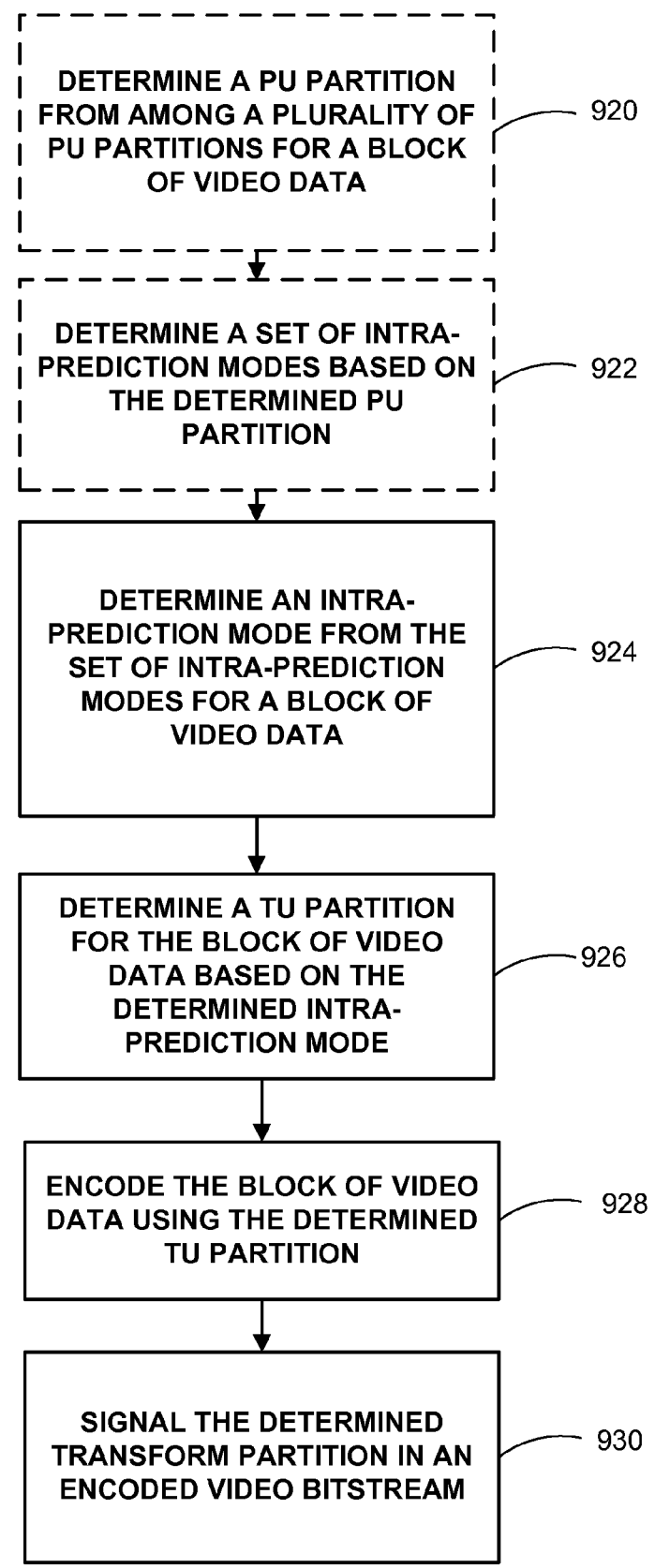
FIG. 9 is a flowchart depicting an example video encoding method according to examples of this disclosure.

FIG. 9 is a flowchart depicting an example video encoding method according to examples of the disclosure. The method of FIG. 9 may be performed by one or more structures of video encoder 20.

Initially, as optional steps, video encoder 20 may be configured to determine a prediction unit (PU) partition from among a plurality of prediction unit partitions for the block of video data (920), and determine a set of intra-prediction modes based on the determined prediction unit partition (922).

In one example, the determined prediction unit partition is a vertically-oriented non-square prediction unit partition, and the set of intra-prediction modes includes vertically-oriented intra-prediction modes. In another example, the determined prediction unit partition is a horizontally-oriented non-square prediction unit partition, and the set of intra-prediction modes includes horizontally-oriented intra-prediction modes.

Video encoder 20 may be further configured to determine an intra-prediction mode from a set of intra-prediction modes for a block of video data (924), determine a transform unit (TU) partition for the block of video data based on the determined intra-prediction mode (926), and encode the block of video data using the determined transform unit partition (928). Video encoder 20 may then be configured to signal the determined transform partition in an encoded video bitstream (930).

In one example, the block of video data is a prediction unit, and a prediction unit partition has a same size and shape as the determined transform unit partition. In another example, the block of video data is a prediction unit, and a prediction unit partition has a different size and shape than the determined transform unit.

In another example of the disclosure, video encoder 20 may be configured to determine the transform unit partition from a set of transform unit partitions based on the intra-prediction mode. In one example, the determined intra-prediction mode is a vertically-oriented intra-prediction mode, and the set of transform unit partitions includes vertically-oriented non-square transform unit partitions. In another example, the determined intra-prediction mode is a horizontally-oriented intra-prediction mode, and the set of transform unit partitions includes horizontally-oriented non-square transform unit partitions. In still another example, the determined intra-prediction mode is a DC mode, a planar mode, or a diagonal mode, and the set of transform unit partitions includes square transform unit partitions.

The set of transform unit partitions may have varying numbers of partitions. In one example, the set of transform unit partitions only includes one transform unit partition per intra-prediction mode. In another example, an equal number of transform unit partitions are present in each set of transform unit partitions for each of the plurality of intra-prediction modes.

In another example of the disclosure, determining the transform unit partition (926) may include performing intra-prediction according to the determined intra-prediction mode on the block of video data to produce a prediction residual, testing a plurality of transform partitions on the prediction residual, and selecting one of the plurality of transform partitions based on the testing.

Figure 10:
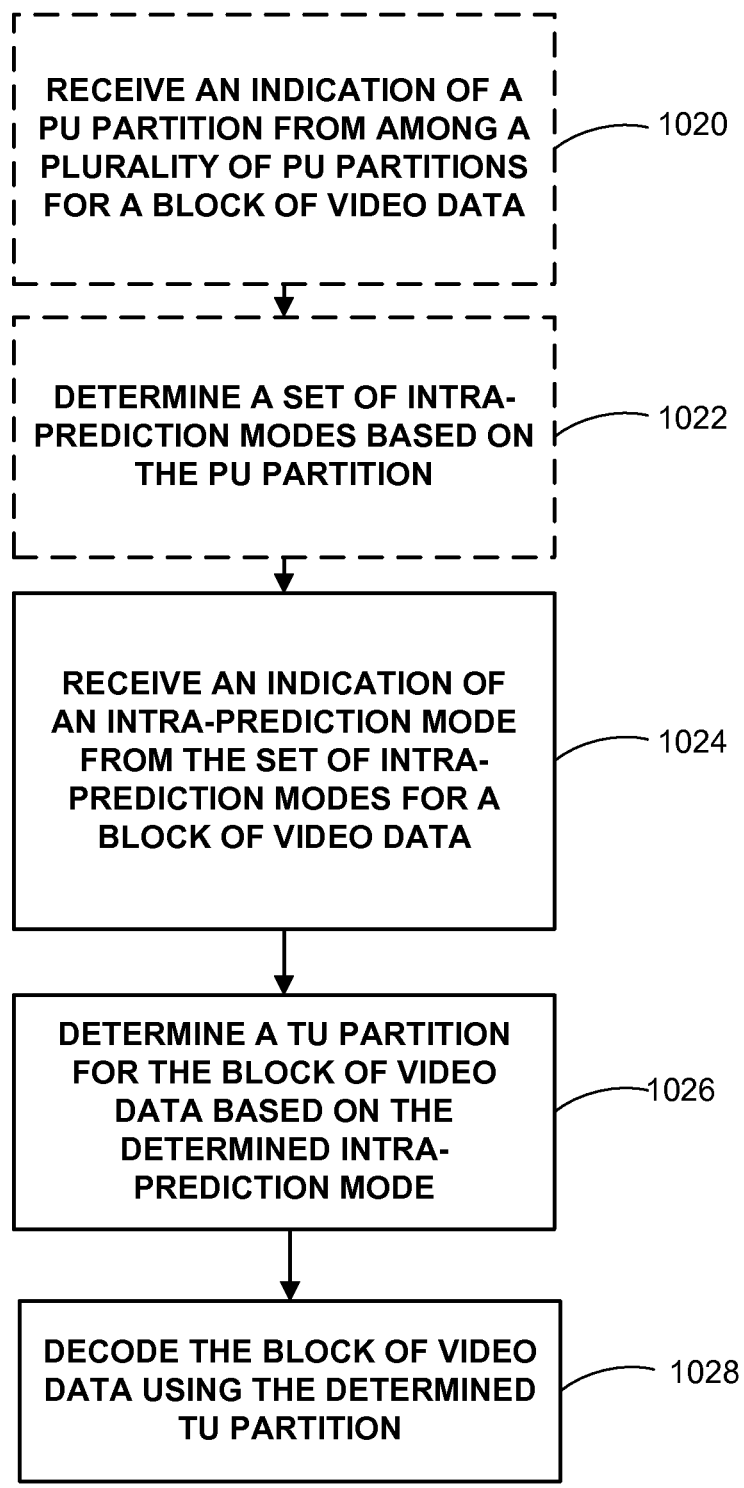
FIG. 10 is a flowchart depicting an example video decoding method according to examples of this disclosure.

FIG. 10 is a flowchart depicting an example video decoding method according to examples of the disclosure. The method of FIG. 10 may be performed by one or more structures of video decoder 30.

Initially, as optional steps, video decoder 30 may be configured to receive an indication of a prediction unit (PU) partition from among a plurality of prediction unit partitions for the block of video data (1020), and determine a set of intra-prediction modes based on the prediction unit partition (1022).

In one example, the prediction unit partition is a vertically-oriented non-square prediction unit partition, and the set of intra-prediction modes includes vertically-oriented intra-prediction modes. In another example, the prediction unit partition is a horizontally-oriented non-square prediction unit partition, and the set of intra-prediction modes includes horizontally-oriented intra-prediction modes.

Video decoder 30 may be further configured to receive an indication of an intra-prediction mode from a set of intra-prediction modes for a block of video data (1024), determine a transform unit partition for the block of video data based on the determined intra-prediction mode (1026), and decode the block of video data using the determined transform unit partition (1028).

In one example, the block of video data is a prediction unit, and a prediction unit partition has a same size and shape as the determined transform unit partition. In another example, the block of video data is a prediction unit, and a prediction unit partition has a different size and shape as the determined transform unit.

In another example of the disclosure, video decoder 30 may be configured to determine the transform unit partition from a set of transform unit partitions based on the intra-prediction mode. In one example, the determined intra-prediction mode is a vertically-oriented intra-prediction mode, and the set of transform unit partitions includes vertically-oriented non-square transform unit partitions. In another example, the determined intra-prediction mode is a horizontally-oriented intra-prediction mode, and the set of transform unit partitions includes horizontally-oriented non-square transform unit partitions. In still another example, the determined intra-prediction mode is a DC mode, a planar mode, or a diagonal mode, and the set of transform unit partitions includes square transform unit partitions.

The set of transform unit partitions may have varying numbers of partitions. In one example, the set of transform unit partitions only includes one transform unit partition per intra-prediction mode. In another example, an equal number of transform unit partitions are present in each set of transform unit partitions for each of the plurality of intra-prediction modes.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A video encoding method comprising:
    determining an intra-prediction mode from a set of intra-prediction modes for a prediction unit of video data, wherein the set of intra-prediction modes includes at least a first intra-prediction mode and a second intra-prediction mode, the second intra-prediction mode is different than the first intra-prediction mode, and wherein each of the first intra-prediction mode and the second intra-prediction mode is at least one of a directional intra-prediction mode, a direct current (DC) intra-prediction mode, or a planar mode;
    determining a subset of transform unit partitions from a set of transform unit partitions based on the determined intra-prediction mode, such that a first subset of transform partitions is determined if the determined intra-prediction mode is the first intra-prediction mode, and a second subset of transform partitions is determined if the determined intra-prediction mode is the second intra-prediction mode, wherein the set of transform unit partitions includes at least the first subset of transform partitions and the second subset of transform partitions, and wherein the second subset of transform partitions is different than the first subset of transform partitions, wherein when:
        the determined intra-prediction mode is a vertically-oriented intra-prediction mode, the subset of transform unit partitions includes vertically-oriented non-square transform unit partitions and does not include at least one horizontally-oriented non-square transform unit partition,
        the determined intra-prediction mode is a horizontally-oriented intra-prediction mode, the subset of transform unit partitions includes horizontally-oriented non-square transform unit partitions and does not include at least one vertically-oriented non-square transform unit partition,
        the determined intra-prediction mode is a DC mode, a planar mode, or a diagonal mode, the subset of transform unit partitions includes square transform unit partitions and does not include at least one non-square transform unit partition;
    determining a transform unit partition for the prediction unit of video data from the subset of transform unit partitions; and
    encoding the prediction unit of video data using the determined transform unit partition.

2. The video encoding method of claim 1, wherein the subset of transform unit partitions only includes one transform unit partition per intra-prediction mode.

3. The video encoding method of claim 1, wherein an equal number of transform unit partitions are present in each subset of transform unit partitions for each intra-prediction mode in the set of intra-prediction modes.

4. The video encoding method of claim 1,
    wherein a partition of the prediction has a different size and shape than the determined transform unit partition.

5. The video encoding method of claim 1, further comprising:
    performing intra-prediction according to the determined intra-prediction mode on the prediction unit of video data to produce a prediction residual,
    wherein determining the transform unit partition comprises:
        testing a plurality of transform partitions of the determined subset of transform unit partitions on the prediction residual; and
        selecting one of the plurality of transform partitions as the determined transform partition based on the testing.

6. The video encoding method of claim 1, further comprising:
    signaling the determined transform partition in an encoded video bitstream.

7. The video encoding method of claim 1, further comprising:
    determining a prediction unit partition from among a plurality of prediction unit partitions for the prediction unit of video data; and determining the set of intra-prediction modes based on the determined prediction unit partition.

8. The video encoding method of claim 7, wherein the determined prediction unit partition is a vertically-oriented non-square prediction unit partition, and wherein the set of intra-prediction modes includes vertically-oriented intra-prediction modes and does not include at least one horizontally-oriented non-square transform unit partition.

9. The video encoding method of claim 7, wherein the determined prediction unit partition is a horizontally-oriented non-square prediction unit partition, and wherein the set of intra-prediction modes includes horizontally-oriented intra-prediction modes and does not include at least one vertically-oriented non-square transform unit partition.

10. A video decoding method comprising:
receiving an indication of an intra-prediction mode from among a set of intra-prediction modes for a prediction unit of video data, wherein the set of intra-prediction modes includes at least a first intra-prediction mode and a second intra-prediction mode, the second intra-prediction mode is different than the first intra-prediction mode, and wherein each of the first intra-prediction mode and the second intra-prediction mode is at least one of a directional intra-prediction mode, a direct current (DC) intra-prediction mode, or a planar mode;
determining a subset of transform unit partitions from a set of transform unit partitions based on the determined intra-prediction mode, such that a first subset of transform partitions is determined if the determined intra-prediction mode is the first intra-prediction mode, and a second subset of transform partitions is determined if the determined intra-prediction mode is the second intra-prediction mode, wherein the set of transform unit partitions includes at least the first subset of transform partitions and the second subset of transform partitions, and wherein the second subset of transform partitions is different than the first subset of transform partitions, wherein when:
the determined intra-prediction mode is a vertically-oriented intra-prediction mode, the subset of transform unit partitions includes vertically-oriented non-square transform unit partitions and does not include at least one horizontally-oriented non-square transform unit partition,
the determined intra-prediction mode is a horizontally-oriented intra-prediction mode, the subset of transform unit partitions includes horizontally-oriented non-square transform unit partitions and does not include at least one vertically-oriented non-square transform unit partition,
the determined intra-prediction mode is a DC mode, a planar mode, or a diagonal mode, the subset of transform unit partitions includes square transform unit partitions and does not include at least one non-square transform unit partition;
determining a transform unit partition for the prediction unit of video data from the subset of transform unit partitions; and
decoding the prediction unit of video data using the determined transform unit partition.

11. The video decoding method of claim 10, wherein the subset of transform unit partitions only includes one transform unit partition per intra-prediction mode.

12. The video decoding method of claim 10, wherein an equal number of transform unit partitions are present in each subset of transform unit partitions for each intra-prediction mode in the set of intra-prediction modes.

13. The video decoding method of claim 10, wherein a partition of the prediction unit has a different size and shape than the determined transform unit partition.

14. The video decoding method of claim 10, further comprising:
receiving an indication of a prediction unit partition from among a plurality of prediction unit partitions for the prediction unit of video data; and
determining the set of intra-prediction modes based on the prediction unit partition.

15. The video decoding method of claim 14, wherein the prediction unit partition is a vertically-oriented non-square prediction unit partition, and wherein the set of intra-prediction modes includes vertically-oriented intra-prediction modes.

16. The video decoding method of claim 14, wherein the prediction unit partition is a horizontally-oriented non-square prediction unit partition, and wherein the set of intra-prediction modes includes horizontally-oriented intra-prediction modes.

17. The method of claim 10, the method being executable on a wireless communication device, wherein the wireless communication device comprises:
a memory configured to store the video data;
a processor configured to execute instructions to process the video data stored in said memory; and
a receiver that is configured to receive the video data, and to receive the indication of the intra-prediction mode.

18. The method of claim 17, wherein the wireless communication device is a cellular telephone and the video data is received by the receiver and modulated according to a cellular communication standard.

19. A video encoding apparatus comprising:
a memory configured to store video data; and
a video encoder in communication with the memory, the video encoder configured to:
determine an intra-prediction mode from a set of intra-prediction modes for a prediction unit of the video data, wherein the set of intra-prediction modes includes at least a first intra-prediction mode and a second intra-prediction mode, the second intra-prediction mode is different than the first intra-prediction mode, and wherein each of the first intra-prediction mode and the second intra-prediction mode is at least one of a directional intra-prediction mode, a direct current (DC) intra-prediction mode, or a planar mode;
determine a subset of transform unit partitions from a set of transform unit partitions based on the determined intra-prediction mode, such that a first subset of transform partitions is determined if the determined intra-prediction mode is the first intra-prediction mode, and a second subset of transform partitions is determined if the determined intra-prediction mode is the second intra-prediction mode, wherein the set of transform unit partitions includes at least the first subset of transform partitions and the second subset of transform partitions, and wherein the second subset of transform partitions is different than the first subset of transform partitions, wherein when:
the determined intra-prediction mode is a vertically-oriented intra-prediction mode, the subset of transform unit partitions includes vertically-oriented non-square transform unit partitions and does not include at least one horizontally-oriented non-square transform unit partition, the determined intra-prediction mode is a horizontally-oriented intra-prediction mode, the subset of transform unit partitions includes horizontally-oriented non-square transform unit partitions and does not include at least one vertically-oriented non-square transform unit partition, the determined intra-prediction mode is a DC mode, a planar mode, or a diagonal mode, the subset of transform unit partitions includes square transform unit partitions and does not include at least one non-square transform unit partition;

determine a transform unit partition for the prediction unit of the video data from the subset of transform unit partitions; and encode the prediction unit of the video data using the determined transform unit partition.

20. The video encoding apparatus of claim 19, wherein the subset of transform unit partitions only includes one transform unit partition per intra-prediction mode.

21. The video encoding apparatus of claim 19, wherein an equal number of transform unit partitions are present in each subset of transform unit partitions for each intra-prediction mode in the set of intra-prediction modes.

22. The video encoding apparatus of claim 19, wherein a partition of the prediction unit has a different size and shape than the determined transform unit partition.

23. The video encoding apparatus of claim 19, wherein the video encoder is further configured to:

perform intra-prediction according to the determined intra-prediction mode on the prediction unit of the video data to produce a prediction residual;

test a plurality of transform partitions of the determined subset of transform unit partitions on the prediction residual; and select one of the plurality of transform partitions as the determined transform partition based on the testing.

24. The video encoding apparatus of claim 19, wherein the video encoder is further configured to:

signal the determined transform partition in an encoded video bitstream.

25. The video encoding apparatus of claim 19, wherein the video encoder is further configured to:

determine a prediction unit partition from among a plurality of prediction unit partitions for the prediction unit of the video data; and determine the set of intra-prediction modes based on the determined prediction unit partition.

26. The video encoding apparatus of claim 25, wherein the determined prediction unit partition is a vertically-oriented non-square prediction unit partition, and wherein the set of intra-prediction modes includes vertically-oriented intra-prediction modes and does not include at least one horizontally-oriented non-square transform unit partition.

27. The video encoding apparatus of claim 25, wherein the determined prediction unit partition is a horizontally-oriented non-square prediction unit partition, and wherein the set of intra-prediction modes includes horizontally-oriented intra-prediction modes and does not include at least one vertically-oriented non-square transform unit partition.

28. A video decoding apparatus comprising:

a memory configured to store video data; and a video decoder in communication with the memory, the video decoder configured to:

receive an indication of an intra-prediction mode from among a set of intra-prediction modes for a prediction unit of the video data, wherein the set of intra-prediction modes includes at least a first intra-prediction mode and a second intra-prediction mode, the second intra-prediction mode is different than the first intra-prediction mode, and wherein each of the first intra-prediction mode and the second intra-prediction mode is at least one of a directional intra-prediction mode, a direct current (DC) intra-prediction mode, or a planar mode;

determine a subset of transform unit partitions from a set of transform unit partitions based on the determined intra-prediction mode, such that a first subset of transform partitions is determined if the determined intra-prediction mode is the first intra-prediction mode, and a second subset of transform partitions is determined if the determined intra-prediction mode is the second intra-prediction mode, wherein the set of transform unit partitions includes at least the first subset of transform partitions and the second subset of transform partitions, and wherein the second subset of transform partitions is different than the first subset of transform partitions, wherein when:

the determined intra-prediction mode is a vertically-oriented intra-prediction mode, the subset of transform unit partitions includes vertically-oriented non-square transform unit partitions and does not include at least one horizontally-oriented non-square transform unit partition, the determined intra-prediction mode is a horizontally-oriented intra-prediction mode, the subset of transform unit partitions includes horizontally-oriented non-square transform unit partitions and does not include at least one vertically-oriented non-square transform unit partition, the determined intra-prediction mode is a DC mode, a planar mode, or a diagonal mode, the subset of transform unit partitions includes square transform unit partitions and does not include at least one non-square transform unit partition;

determine a transform unit partition for the prediction unit of the video data from the subset of transform unit partitions; and decode the prediction unit of the video data using the determined transform unit partition.

29. The video decoding apparatus of claim 28, wherein the subset of transform unit partitions only includes one transform unit partition per intra-prediction mode.

30. The video decoding apparatus of claim 28, wherein an equal number of transform unit partitions are present in each set of transform unit partitions for each intra-prediction mode in the set of intra-prediction modes.

31. The video decoding apparatus of claim 28, wherein a prediction partition of the prediction unit has a different size and shape than the determined transform unit partition.

32. The video decoding apparatus of claim 28, wherein the video decoder is further configured to:

receive an indication of a prediction unit partition from among a plurality of prediction unit partitions for the prediction unit of the video data; and determine the set of intra-prediction modes based on the prediction unit partition.

33. The video decoding apparatus of claim 32, wherein the prediction unit partition is a vertically-oriented non-square prediction unit partition, and wherein the set of intra-prediction modes includes vertically-oriented intra-prediction modes.

34. The video decoding apparatus of claim 32, wherein the prediction unit partition is a horizontally-oriented non-square prediction unit partition, and wherein the set of intra-prediction modes includes horizontally-oriented intra-prediction modes.

35. The video decoding apparatus of claim 27, wherein the video decoding apparatus is a wireless communication device, further comprising:
a receiver that is configured to receive the video data, and to receive the indication of the intra-prediction mode.

36. The video decoding apparatus of claim 35, wherein the wireless communication device is a cellular telephone and the video data is received by the receiver and modulated according to a cellular communication standard.

37. A video encoding apparatus comprising:
means for determining an intra-prediction mode from a set of intra-prediction modes for a prediction unit of video data, wherein the set of intra-prediction modes includes at least a first intra-prediction mode and a second intra-prediction mode, the second intra-prediction mode is different than the first intra-prediction mode, and wherein each of the first intra-prediction mode and the second intra-prediction mode is at least one of a directional intra-prediction mode, a direct current (DC) intra-prediction mode, or a planar mode;
means for determining a subset of transform unit partitions from a set of transform unit partitions based on the determined intra-prediction mode, such that a first subset of transform partitions is determined if the determined intra-prediction mode is the first intra-prediction mode, and a second subset of transform partitions is determined if the determined intra-prediction mode is the second intra-prediction mode, wherein the set of transform unit partitions includes at least the first subset of transform partitions and the second subset of transform partitions, and wherein the second subset of transform partitions is different than the first subset of transform partitions, wherein when:
the determined intra-prediction mode is a vertically-oriented intra-prediction mode, the subset of transform unit partitions includes vertically-oriented non-square transform unit partitions and does not include at least one horizontally-oriented non-square transform unit partition,
the determined intra-prediction mode is a horizontally-oriented intra-prediction mode, the subset of transform unit partitions includes horizontally-oriented non-square transform unit partitions and does not include at least one vertically-oriented non-square transform unit partition,
the determined intra-prediction mode is a DC mode, a planar mode, or a diagonal mode, the subset of transform unit partitions includes square transform unit partitions and does not include at least one non-square transform unit partition;
means for determining a transform unit partition for the prediction unit of video data from the subset of transform unit partitions; and
means for encoding the prediction unit of video data using the determined transform unit partition.

38. A video decoding apparatus comprising:
means for receiving an indication of an intra-prediction mode from among a plurality of intra-prediction modes for a prediction unit of video data, wherein the set of intra-prediction modes includes at least a first intra-prediction mode and a second intra-prediction mode, the second intra-prediction mode is different than the first intra-prediction mode, and wherein each of the first intra-prediction mode and the second intra-prediction mode is at least one of a directional intra-prediction mode, a direct current (DC) intra-prediction mode, or a planar mode;
means for determining a subset of transform unit partitions from a set of transform unit partitions based on the determined intra-prediction mode, such that a first subset of transform partitions is determined if the determined intra-prediction mode is the first intra-prediction mode, and a second subset of transform partitions is determined if the determined intra-prediction mode is the second intra-prediction mode, wherein the set of transform unit partitions includes at least the first subset of transform partitions and the second subset of transform partitions, and wherein the second subset of transform partitions is different than the first subset of transform partitions, wherein when:
the determined intra-prediction mode is a vertically-oriented intra-prediction mode, the subset of transform unit partitions includes vertically-oriented non-square transform unit partitions and does not include at least one horizontally-oriented non-square transform unit partition,
the determined intra-prediction mode is a horizontally-oriented intra-prediction mode, the subset of transform unit partitions includes horizontally-oriented non-square transform unit partitions and does not include at least one vertically-oriented non-square transform unit partition,
the determined intra-prediction mode is a DC mode, a planar mode, or a diagonal mode, the subset of transform unit partitions includes square transform unit partitions and does not include at least one non-square transform unit partition;
means for determining a transform unit partition for the prediction unit of video data from the subset of transform unit partitions; and
means for decoding the prediction unit of video data using the determined transform unit partition.

39. A non-transitory computer-readable storage medium storing instructions that, when executed, cause one or more processors configured to encode video data to:
determine an intra-prediction mode from a set of intra-prediction modes for a prediction unit of video data, wherein the set of intra-prediction modes includes at least a first intra-prediction mode and a second intra-prediction mode, the second intra-prediction mode is different than the first intra-prediction mode, and wherein each of the first intra-prediction mode and the second intra-prediction mode is at least one of a directional intra-prediction mode, a direct current (DC) intra-prediction mode, or a planar mode;
determine a subset of transform unit partitions from a set of transform unit partitions based on the determined intra-prediction mode, such that a first subset of transform partitions is determined if the determined intra-prediction mode is the first intra-prediction mode, and a second subset of transform partitions is determined if the determined intra-prediction mode is the second intra-prediction mode, wherein the set of transform unit partitions includes at least the first subset of transform partitions and the second subset of transform partitions, and wherein the second subset of transform partitions is different than the first subset of transform partitions, wherein when:
the determined intra-prediction mode is a vertically-oriented intra-prediction mode, the subset of transform unit partitions includes vertically-oriented non-square transform unit partitions and does not include at least one horizontally-oriented non-square transform unit partition,
the determined intra-prediction mode is a horizontally-oriented intra-prediction mode, the subset of transform unit partitions includes horizontally-oriented non-square transform unit partitions and does not include at least one vertically-oriented non-square transform unit partition,
the determined intra-prediction mode is a DC mode, a planar mode, or a diagonal mode, the subset of transform unit partitions includes square transform unit partitions and does not include at least one non-square transform unit partition;
determine a transform unit partition for the prediction unit of video data from the subset of transform unit partitions; and
encode the prediction unit of video data using the determined transform unit partition.

40. The non-transitory computer-readable storage medium of claim 39, wherein the subset of transform unit partitions only includes one transform unit partition per intra-prediction mode.

41. The non-transitory computer-readable storage medium of claim 39, wherein an equal number of transform unit partitions are present in each subset of transform unit partitions for each intra-prediction mode in the set of intra-prediction modes.

42. The non-transitory computer-readable storage medium of claim 39, wherein a partition of the prediction has a different size and shape than the determined transform unit partition.

43. The non-transitory computer-readable storage medium of claim 39, storing further instructions that, when executed, cause one or more processors configured to encode video data to:
perform intra-prediction according to the determined intra-prediction mode on the prediction unit of video data to produce a prediction residual,
wherein instructions that, when executed, cause the one or more processors to determine the transform unit partition comprises instructions that, when executed, cause the one or more processors to:
test a plurality of transform partitions of the determined subset of transform unit partitions on the prediction residual; and
select one of the plurality of transform partitions as the determined transform partition based on the testing.

44. The non-transitory computer-readable storage medium of claim 39, storing further instructions that, when executed, cause one or more processors configured to encode video data to:
signal the determined transform partition in an encoded video bitstream.

45. The non-transitory computer-readable storage medium of claim 39, storing further instructions that, when executed, cause one or more processors configured to encode video data to:
determine a prediction unit partition from among a plurality of prediction unit partitions for the prediction unit of video data; and
determine the set of intra-prediction modes based on the determined prediction unit partition.

46. A non-transitory computer-readable storage medium storing instructions that, when executed, cause one or more processors configured to decode video data to:
receive an indication of an intra-prediction mode from among a plurality of intra-prediction modes for a prediction unit of video data, wherein the set of intra-prediction modes includes at least a first intra-prediction mode and a second intra-prediction mode, the second intra-prediction mode is different than the first intra-prediction mode, and wherein each of the first intra-prediction mode and the second intra-prediction mode is at least one of a directional intra-prediction mode, a direct current (DC) intra-prediction mode, or a planar mode;
determine a subset of transform unit partitions from a set of transform unit partitions based on the determined intra-prediction mode, such that a first subset of transform partitions is determined if the determined intra-prediction mode is the first intra-prediction mode, and a second subset of transform partitions is determined if the determined intra-prediction mode is the second intra-prediction mode, wherein the set of transform unit partitions includes at least the first subset of transform partitions and the second subset of transform partitions, and wherein the second subset of transform partitions is different than the first subset of transform partitions, wherein when:
the determined intra-prediction mode is a vertically-oriented intra-prediction mode, the subset of transform unit partitions includes vertically-oriented non-square transform unit partitions and does not include at least one horizontally-oriented non-square transform unit partition,
the determined intra-prediction mode is a horizontally-oriented intra-prediction mode, the subset of transform unit partitions includes horizontally-oriented non-square transform unit partitions and does not include at least one vertically-oriented non-square transform unit partition,
the determined intra-prediction mode is a DC mode, a planar mode, or a diagonal mode, the subset of transform unit partitions includes square transform unit partitions and does not include at least one non-square transform unit partition;
determine a transform unit partition for the prediction unit of video data from the subset of transform unit partitions; and
decode the prediction unit of video data using the determined transform unit partition.

47. The non-transitory computer-readable storage medium of claim 46, wherein the subset of transform unit partitions only includes one transform unit partition per intra-prediction mode.

48. The non-transitory computer-readable storage medium of claim 46, wherein an equal number of transform unit partitions are present in each subset of transform unit partitions for each intra-prediction mode in the set of intra-prediction modes.

49. The non-transitory computer-readable storage medium of claim 46, wherein a partition of the prediction unit has a different size and shape than the determined transform unit partition.

50. The non-transitory computer-readable storage medium of claim 46, storing further instructions that, when executed, cause one or more processors configured to decode video data to:
- receive an indication of a prediction unit partition from among a plurality of prediction unit partitions for the prediction unit of video data; and
- determine the set of intra-prediction modes based on the prediction unit partition.

51. The non-transitory computer-readable storage medium of claim 50, wherein the prediction unit partition is a vertically-oriented non-square prediction unit partition, and wherein the set of intra-prediction modes includes vertically-oriented intra-prediction modes.

52. The non-transitory computer-readable storage medium of claim 50, wherein the prediction unit partition is a horizontally-oriented non-square prediction unit partition, and wherein the set of intra-prediction modes includes horizontally-oriented intra-prediction modes.

* * * * *